United States Patent [19]

Ikedo et al.

[11] Patent Number: 4,507,768
[45] Date of Patent: Mar. 26, 1985

[54] AUTOMATIC DISC LOADING AND UNLOADING SYSTEM FOR RECORDING-DISC PLAYBACK APPARATUS

[75] Inventors: Yuji Ikedo; Kunio Abe; Masatsugu Saito, all of Tokorozawa, Japan

[73] Assignee: Pioneer Electronic Corporation, Tokyo, Japan

[21] Appl. No.: 235,225

[22] Filed: Feb. 17, 1981

[30] Foreign Application Priority Data

Feb. 15, 1980 [JP] Japan .................................. 55-17543
Feb. 15, 1980 [JP] Japan .................................. 55-17549

[51] Int. Cl.³ .......................... G11B 1/00; G11B 17/04
[52] U.S. Cl. ..................................... 369/77.1; 369/194; 369/263
[58] Field of Search ...................... 369/77.1, 263, 191, 369/194

[56] References Cited

U.S. PATENT DOCUMENTS

| 3,300,222 | 1/1967 | Scott ................................. | 369/263 |
| 4,098,510 | 7/1978 | Suzuki et al. ........................ | 369/77 |
| 4,302,832 | 11/1981 | Cheeseboro .......................... | 369/77 |

FOREIGN PATENT DOCUMENTS 111703  9/1978  Japan ..................................... 369/77

*Primary Examiner*—Steven L. Stephan
*Attorney, Agent, or Firm*—Griffin, Branigan & Butler

[57] ABSTRACT

An automatic disc loading and unloading system of an audio and/or video recording-disc playback apparatus, in which the recording disc to be played back is automatically loaded into the playback apparatus and conveyed into a correct position with respect to the turntable depending upon the size of the recording disc and is automatically moved out of the playback apparatus upon completion of the playback operation.

21 Claims, 15 Drawing Figures

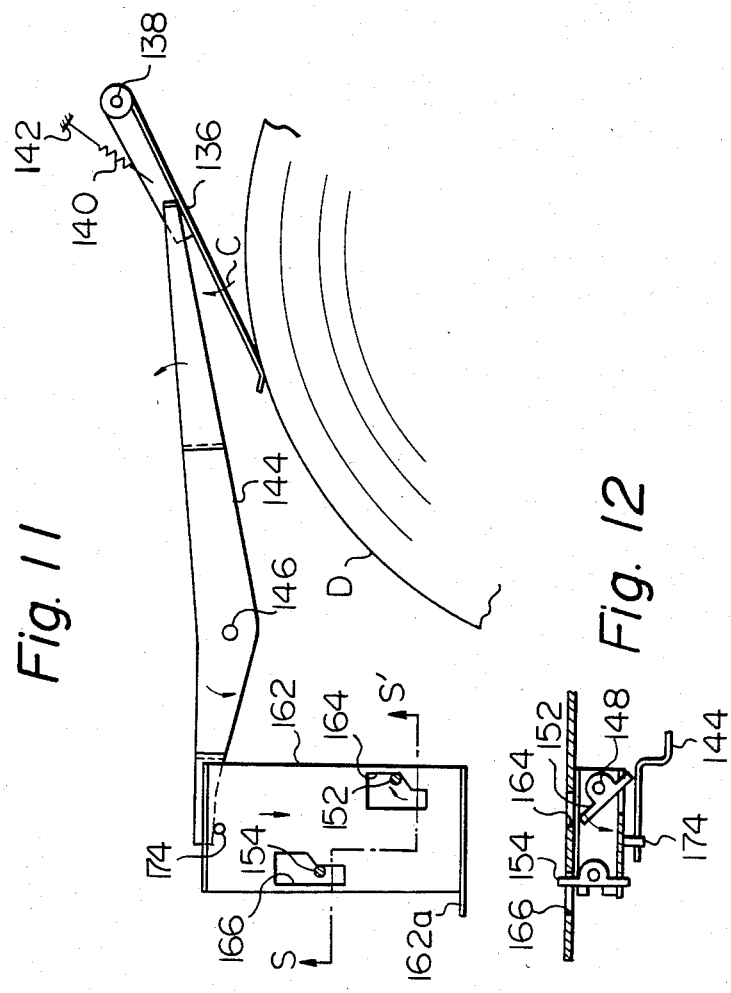

AUTOMATIC DISC LOADING AND UNLOADING SYSTEM FOR RECORDING-DISC PLAYBACK APPARATUS

FIELD OF THE INVENTION

The present invention relates to an audio and/or video disc playback apparatus and, more particularly, to an automatic disc loading and unloading system which is adapted to have an audio and/or video disc loaded into and unloaded from the playback apparatus in an automated fashion.

BACKGROUND OF THE INVENTION

A variety of automatic disc loading and unloading systems have thus far been proposed and put to use for audio and/or video disc playback apparatus. One of the drawbacks which have been inherent in such prior-art automatic disc loading and unloading systems is the objectionably large-sized construction of the system required for the accommodation of the movements of the recording disc to be loaded into and thereafter unloaded out of the playback apparatus.

In a prior-art automatic disc loading and unloading system, furthermore, a disc carrier mechanism is used in which the recording disc being loaded into or unloaded out of the playback apparatus is seized between a pair of disc retaining members which are held in pressing engagement with the outer circumferential edge of the disc and which is forced to press the disc in radial directions of the disc. If the retaining members of the disc carrier mechanism of this nature are pressed against the circumferential edge of the disc by means of preloaded springs, the pressing forces exerted on the recording disc from such spring-loaded retaining members may happen to be excessive unless the spring constants of the springs urging the retaining members against the circumferential edge of the disc are properly selected to be compatible with recording discs of any sizes and/or if the springs, spring-loaded retaining members and any other members and elements associated with the springs and spring-loaded retaining members are not correctly and precisely sized, designed and/or arranged. If excessive pressing forces are applied radially to the circumferential edge of the recording disc being carried by and between the spring-loaded retaining members, the recording disc might be forced to warp or otherwise deformed by such forces.

Another drawback which has been inherent in a prior-art automatic disc loading and unloading system of a recording disc playback apparatus is the disproportionately intricate construction of the mechanism by means of which the recording disc loaded into the playback apparatus is to be brought into a correct position having its center axis aligned with the axis of rotation of the turntable of the playback apparatus.

When, furthermore, a recording disc is to be withdrawn from a playback apparatus upon completion of the playback operation with the disc, the recording disc released from the turntable of the playback apparatus is conveyed to withdraw from the playback apparatus under the guidance of a disc guide panel which projects from the front end of the casing structure of the apparatus so as to prevent the disc from falling from the casing structure while the disc is being withdrawn from the playback apparatus. The provision of such a disc guide panel requires an objectionably large space in front of the casing structure of the playback apparatus and, thus, not only impairs the external appearance of the playback apparatus as a whole but the presence of the guide panel underneath the disc withdrawn from the casing structure tends to hinder the disc from being manually removed from the playback apparatus.

The guide structure or mechanism used for guiding the passage of a recording disc into and out of the casing structure of an audio and/or video disc playback apparatus using a conventional automatic disc loading and unloading system is usually fixedly connected to or integral with the casing structure, particularly the front wall portion or panel member of the casing structure. Furthermore, the various operational units and assemblies such as, for example, the turntable assembly, turntable drive unit, pickup arm assembly, pickup-arm drive assembly and so forth of the playback apparatus are mounted on a support structure which is also usually secured to or integral with the casing structure of the playback apparatus. The casing structure of a playback apparatus is usually arranged to have a component unit or some coponent units such as an amplifier unit mounted thereon when the playback apparatus is installed for use. During operation of the disc playback apparatus thus arranged, the shocks and vibrations which may be produced by the motions and movements of these operational units and assemblies mounted on such a support structure are therefore transferred through the casing structure to the component unit or units through the casing structure. Such a problem could be solved if the support structure is positioned within the casing structure by means of shock absorbing support elements.

On the other hand, an audio and/or video disc playback apparatus of the type equipped with an automatic disc loading and unloading system is usually provided with a disc-size responsive automatic pickup-arm lead-in control device which is adapted to detect the size, or diameter, of the recording disc to be played back and to enable the pickup arm of the playback apparatus to control the automatic drive means for the pickup arm to drive the pickup arm for lead-in motion from the rest position thereof automatically to a position which is predetermined for the size of the recording disc to be played back. In a prior-art automatic disc loading and unloading system of a playback apparatus of this type, such a pick-up-art lead-in control device ordinarily uses contactless size detection means utilizing, for example, photoelectric transducer elements adapted to produce an electric signal representative of the particular size, or diameter, of the recording disc to be played back. The electric signal thus produced by the photoelectric transducer elements is supplied to a control circuit and is converted into a suitable control signal to dictate the motion of the automatic pickup arm drive means. One of the problems encountered in an automatic disc loading and unloading system using a pickup-arm lead-in control device of this nature is the high production cost resulting from the use of the costly photoelectric transducer elements as the contactless size detection means and further from the provision of an electro-mechanical conversion unit which is required for the conversion of an electric control signal into a corresponding mechanical displacement in the automatic pickup arm drive means. Another problem results from the necessity of providing an extra control circuit for precluding the size detection means from being erroneously responsive to the size of the recording disc conveyed to an incorrect position with respect to the turntable of the playback apparatus.

In order that the recording disc to be played back be enabled to be correctly positioned on the turntable of a playback apparatus, there has been proposed a disc support assembly which is adapted to cause the turntable to move upwardly until the spindle projecting from the turntable is inserted upwardly through the center hole in the recording disc which has been conveyed into a correct position above and with respect to the turntable. Problems have been experienced in a disc support assembly of this nature in that the disc support assembly per se is excessively intricate in construction and accordingly excessively expensive; and in that extreme precision machining is required for the fabrication of the turntable and the turntable lifting mechanism supporting the turntable rotatably with respect to the lifting mechanism by means of precision bearings.

These problems are encountered in connection with recording discs of the non-donut-shaped types but similar problems are experienced in connection with recording discs of the donut-shaped types such as extended play (EP) discs. For the playback of an extended play disc, the disc is placed and held in coaxial position on the turntable of the playback apparatus by means of a special adapter, herein referred to as EP adapter in lieu of the spindle for recording discs of the non-donut-shaped types. In an automatic disc loading and unloading system of a playback apparatus, a disc support assembly including such an EP adapter is designed in such a manner as to be capable of projecting upwardly from the center hole in the donut-shaped or extended play disc or being withdrawn into the upwardly open concavity in the turntable when the EP adapter is depressed downwardly or caused to turn about the center axis of the recording disc placed on the turntable. Not only is such a disc support assembly extremely intricate in construction and arrangement but, prior to the loading of a recording disc into the playback apparatus, cumbersome manipulation of the EP adapter depending upon the size of the disc is necessitated for the user of the playback apparatus.

On the other hand, an automatic disc loading and unloading system of a disc playback apparatus usually comprises a disc inlet and outlet opening at the front of the casing structure of the playback apparatus and a disc transfer mechanism adapted to convey the disc into or out of the casing structure through such an opening prior to or upon completion, respectively, of the playback operation with the recording disc. In a disc loading and unloading system of this nature, a disc advance detection device is provided intermediate between the disc inlet and outlet opening and the disc transfer mechanism of the system so as to detect the advancing movement of the recording disc manually inserted into the casing structure through the disc inlet and outlet opening. A problem is pointed out in connection with an automatic disc loading and unloading system of this nature in that the recording disc inserted into the casing structure by manual effort must be further pressed into the casing structure by human intervention after the disc transfer mechanism has been actuated and made ready to drive the recording disc to travel inwardly of the casing structure. Another problem encountered in the automatic disc, loading and unloading system is that the disc transfer mechanism is left in a driven condition if the recording disc, once inserted manually into the casing structure and brought into the position to actuate the detection device fails to be further pressed to move deeper into the casing structure by manual effort.

The disc transfer mechanism of a prior-art automatic disc loading and unloading system of a playback apparatus is adapted solely to drive a recording disc toward and away from the turntable of the playback apparatus, but is not capable of lending itself to correctly positioning the disc with respect to the turntable. If, therefore, the recording disc which has been conveyed into a position above the turntable by means of such a disc transfer mechanism, fails to be correctly positioned with respect to the turntable, the recording disc in such an incorrect position would be raised by the spindle when the turntable is lifted to cause the spindle to pass through the center hole in the disc and, as a consequence, would not be correctly received on the upper face of the turntable with the spindle inserted through the center hole in the disc. Such an inconvenience could be avoided if the disc transfer mechanism per se is capable of not only driving the recording disc toward and away from the turntable but correctly and accurately adjusting the direction of advance of the recording disc being conveyed toward the turntable.

Furthermore, one of the important requirements of an audio and/or video disc playback apparatus of the type equipped with an automatic disc loading and unloading system is to eliminate the possibility of double loading of recording discs for preventing a recording disc from being loaded into the playback apparatus during playback operation of another recording disc. An automatic disc loading and unloading apparatus of a playback apparatus is therefore provided with double loading preventive means adapted to avoid such double loading of a recording disc into the playback apparatus. The double loading preventive means of a conventional automatic disc loading and unloading apparatus has been composed of blocking members arranged to move into and out of the path of a recording disc toward the turntable of the playback apparatus and extra drive means adapted to drive the blocking members for movement through the path. The provision of such blocking members and drive means adds to the complexity of the entire construction and arrangement of the automatic disc loading and unloading system of the playback apparatus. The construction and arrangement of the automatic disc loading and unloading system of a playback apparatus could however be significantly simplified if these extra members and means are elimited from the system.

The double loading preventive means of a prior-art automatic disc loading and unloading system of a playback apparatus has had another drawback in that the blocking members of such means must be actuated at timings controlled with utmost accuracy.

On the other hand, audio and/or video recording discs are presently available in three standardized sizes and are thus categorized in size into small-sized or 7-inch diameter recording discs, medium-sized or 10-inch diameter recording discs, and large-sized or 12-inch diameter recording discs. The recording disc loaded into a playback apparatus for reproducing purposes must for this reason be correctly positioned with respect to the turntable of the playback apparatus depending upon the size or diameter of the particular recording disc. An automatic disc loading and unloading system of a playback apparatus has usually incorporated therein a selective disc positioning mechanism which is responsive to the size or diameter of the disc loaded into the playback apparatus and which is capable of automatically guiding the recording disc into a correct coaxial position with respect to the turntable depending upon the detected size or diameter of the disc. The selective disc positioning mechanism of a prior-art automatic disc loading and unloading system of a playback apparatus has, however, been so complex in construction and arrangement and accordingly so expensive in production cost that from an economical point of view, such a mechanism has not had fully acceptable simplicity of construction.

The selective disc positioning mechanism of an automatic disc loading and unloading system of a playback apparatus is, furthermore, required to resume its initial condition upon withdrawal of a recording disc of any size from the playback apparatus after each playback operation so that the positioning mechanism is capable of being ready to be responsive to the size of the recording disc to be put into subsequent playback operation. An automatic disc loading and unloading system including a selective disc positioning mechanism is therefore further provided with reset means operative to place the positioning mechanism into the initial condition thereof in response to the termination of a playback operation with a recording disc. The reset means for the selective disc positioning mechanism of a conventional automatic disc loading and unloading system of a playback apparatus has however been constructed and arranged to operate various component units of the positioning mechanism individually of one another and has, for this reason, not only been complex in construction and arrangement and accordingly expensive in production cost but required intricate controls for enabling the component units of the mechanism to be operated accurately and with certainty.

The reset means of the automatic disc loading and unloading system of a playback apparatus is actuated by suitable departure detection means responsive to the withdrawal of a recording disc from the playback apparatus upon completion of the playback operation with the recording disc. Such departure detection means of a prior-art automatic disc loading and unloading system of a playback apparatus has been of the type using contactless departure responsive elements such as photoelectric transducer elements and has therefore been disproportionately expensive due to the high prices of the photoelectric transducer elements.

The present invention contemplates provision of an audio and/or video disc playback apparatus featuring an improved automatic disc loading and unloading system which is adapted to solve and eliminate the above described problems and drawbacks which have thus far been inherent and/or encountered in prior-art automatic disc loading and unloading systems of audio and/or video disc playback apparatus.

SUMMARY OF THE INVENTION

In accordance with one aspect of the present invention, there is provided an automatic disc loading and unloading system of an audio and/or video disc playback apparatus including a casing structure having a front wall portion formed with a laterally elongated opening and a support structure positioned within the casing structure, the automatic disc loading and unloading system basically comprising elastic support elements having the support structure elastically supported by and within the casing structure through the elastic support element, a disc support assembly positioned on the support structure and including a turntable structure rotatable about a vertical axis which is fixed with respect to the support structure, a disc transfer mechanism supported on the support structure and positioned partially intermediate between the disc support assembly and the front wall portion of the casing, the disc transfer mechanism being operative to drive a recording disc between the disc support assembly and the front wall portion of the casing structure, and a disc guide structure supported on the support structure and partially located between the disc transfer mechanism and the front wall portion of the casing structure, the guide structure partially projecting outwardly from the front wall of the casing structure through the above mentioned elongated opening in the front wall portion of the casing structure.

In accordance with another aspect of the present invention, there is provided an automatic disc loading and unloading system of an audio and/or video disc playback apparatus including a casing structure having horizontal front-and-rear directions and horizontal lateral directions substantially perpendicular to the front-and-rear directions and a support structure positioned within the casing structure, the automatic disc loading and unloading system comprising a disc support assembly positioned on the support structure and including a turntable structure rotatable about a vertical axis which is fixed with respect to the support structure, a disc transfer mechanism supported on the support structure and operative to drive a recording disc to travel to and from a predetermined position with respect to the turntable strucstructure, and a selective disc positioning mechanism responsive to the diameter of the recording disc moved to the above mentioned predetermined position thereof, the disc positioning mechanism being operative to adjust the position of the recording disc into a correct coaxial position having its center axis substantially aligned with the axis of rotation of the turntable structure.

The above mentioned selective disc positioning mechanism comprises a movable member which is movable selectively into and out of each of at least two different positions with respect to the support structure. In this instance, the automatic disc loading and unloading system according to the present invention may further comprise a cam mechanism supported on the support structure and including a cam member having at least two cam surface portions and movable with the above mentioned movable member with respect to the support structure selectively into and out of each of at least two different positions respectively corresponding to the aforesaid different positions of the movable member, and a cam follower movable selectively into and out of each of at least two different positions with respect to the support structure and engageable selectively with each of the cam surface portions of the cam member depending upon the position of the cam member with respect to the support structure, the cam follower member being moved into one of the different positions thereof with respect to the support structure depending upon the cam surface portion which the cam member has brought into contact with the cam follower member.

The above mentioned disc support assembly of the automatic disc loading and unloading system according to the present invention may further include a member supported by the support structure and positioned above the turntable structure and biasing means supported by the support structure and urging the turntable structure upwardly toward the above mentioned member of the disc support assembly until the turntable structure is brought into engagement with the particular member. In this instance, the automatic disc loading and unloading system according to the present invention further comprises turntable lowering means supported on the support structure and downwardly engageable with the turntable structure, the turntable lowering means being vertically movable with respect to the support structure and being brought into downwardly pressing engagement with the turntable structure and forcing the turntable structure to move downwardly below the above mentioned member of the disc support assembly when the turntable lowering means is moved downwardly to a predetermined vertical position with respect to the support structure. The aforesaid member of the disc support assembly may consist of a disc clamping member operative to have a recording disc clamped between the clamping member and the turntable structure when the recording disc is held in the above mentioned correct coaxial position with respect to the turntable structure and when the turntable structure is disengaged from the above mentioned turntable lowering means.

From another point of view, the disc support assembly of the automatic disc loading and unloading system basically constructed as above described may further include an adapter which has a circular cross section and a center axis substantially aligned with the axis of rotation of the turntable structure and which is axially movable with respect to the turntable structure, and a disc clamping member supported by the support structure and positioned above the turntable structure and the adapter and engageable with each of the turntable structure and the adapter, the clamping member being operative to have a recording disc clamped between the clamping member and the turntable structure. In this instance, the turntable structure may be formed with an upwardly open concavity having a circular cross section with a diameter not less than the diameter of the aforesaid circular cross section of the above mentioned adapter so that the adapter is permitted to withdraw into the concavity in the turntable structure. Furthermore, the above mentioned disc clamping member may be formed with a downwardly open concavity having a circular cross section with a diameter not less than the diameter of the circular cross section of the above mentioned adapter so that the adapter is permitted to upwardly project into the concavity in the clamping member. The adapter is preferably chamfered or bevelled along its upper and outer peripheral edge.

BRIEF DESCRIPTION OF THE DRAWINGS

The features and advantages of an automatic disc loading and unloading system of an audio and/or video recording-disc playback apparatus according to the present invention will be appreciated more clearly from the following description taken in conjunction with the accompanying drawings in which like reference numerals respectively designate the same structure, units, members and elements and in which:

FIG. 11 is a fragmentary plan view showing part of each of a disc-size discriminating mechanism and a selective disc positioning mechanism of a disc loading and unloading system embodying the present invention;

FIG. 12 is a cross sectional view taken on lines S—S' in FIG. 11;

DESCRIPTION OF THE PREFERRED EMBODIMENT

Figure 1:
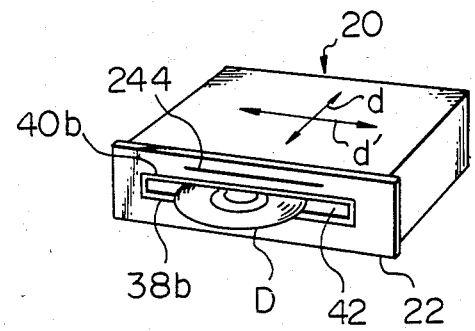
FIG. 1 is a schematic perspective view showing the external appearance of an audio and/or video recording-disc playback apparatus having incorporated therein an automatic disc loading and unloading system embodying the present invention.
Figure 2:
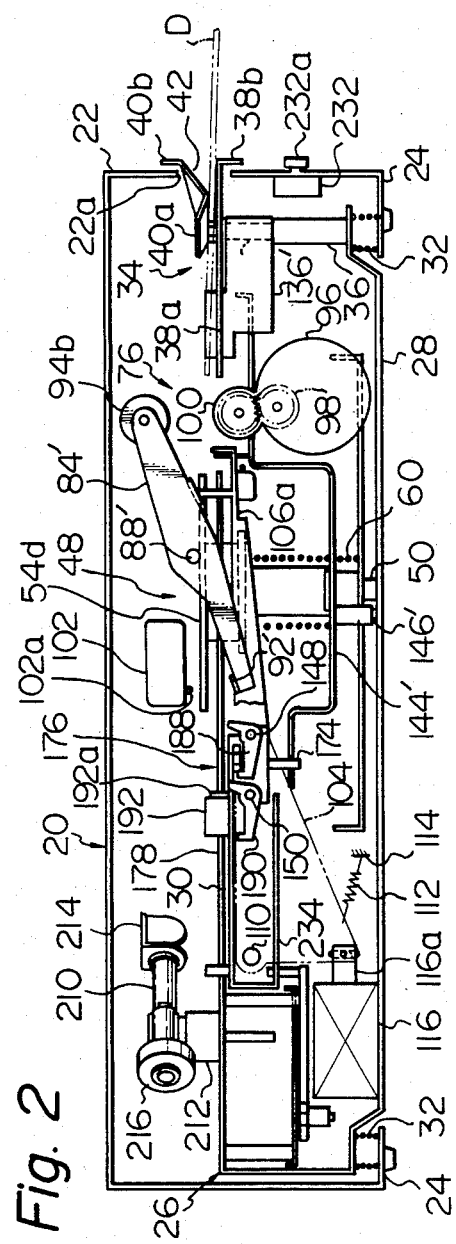
FIG. 2 is a side elevation view showing an automatic disc loading and unloading system embodying the present invention with some of the component units and members of the system omitted therefrom for simplicity of illustration.

Referring to FIG. 1, an automatic disc loading and unloading system embodying the present invention comprises a generally box-shaped hollow casing structure 20 having horizontal front-and-rear directions indicated by arrow-heads d and horizontal lateral directions perpendicular to the front-and-rear direction d as indicated by arrow-heads d'. As will be seen more clearly from FIG. 2 of the drawings, the casing structure 20 has at its front end a vertical front wall portion 22 formed with a horizontally elongated slot 22a. In FIG. 2, the casing structure 20 further has a substantially horizontal bottom wall portion 24 formed with an opening 24a at the bottom of the interior of the casing structure 20.

The casing structure 20 has enclosed therein a support structure 26 having a horizontal lower chassis portion 28 and a horizontal upper chassis portion 30 which is upwardly spaced apart substantially in parallel from the lower chassis portion 28. The support structure 26 is elastically suspended within and with respect to the casing structure 20 by suitable elastic support elements such as a plurality of helical compression springs 32 each seated between the bottom wall portion 24 of the casing structure 20 and the lower chassis portion 28 of the support structure 26.

The support structure 26 thus elastically suspended within the casing structure 20 has fixedly supported thereon a disc guide structure 34 which is positioned in the vicinity of the front wall portion 22 of the casing structure 20. The disc guide structure 34 comprises a suitable number of vertical posts 36 located inside and in the vicinity of the front wall portion 22 of the casing structure 20 and vertically upstanding from the lower chassis portion 28 of the support structure 26. The vertical posts 36 have fixedly supported on their respective upper end portions a lower guide member 38 and an upper guide member 40. The lower guide member 28 has a horizontal inner panel portion 38a horizontally extending in a major proportion within the casing structure and partially projecting forwardly from the front wall portion 22 of the casing structure 20 through the slot 22a in the wall portion 22, and an outer edge portion 38b which is bent downwardly from the front end of the panel portion 38a. The panel portion 38a has a substantially flat, smooth upper face which is substantially flush with the upper face of the upper chassis portion 30 of the support structure 26 as will be seen from FIGS. 2 and 3. On the other hand, the upper guide member 40 has a bent inner panel portion 40a spaced apart upwardly from the upper face of the horizontal inner panel portion 38a of the lower guide member 38 and partially projecting outwardly from the front wall portion 22 of the casing structure 20 through the slot 22a in the wall portion 22, and an outer edge portion 40b which is upwardly bent from the front end of the bent inner panel portion 40a. The bent inner panel portion 40a of the upper guide member 40 is downwardly inclined rearwardly from the lower end of the edge portion 40b and is further bent upwardly and rearwardly over the upper face of the panel portion 38a of the lower guide member 38. As will be seen from FIGS. 1 and 2 and further from FIG. 3 of the drawings, the respective outer edge portions 38b and 40b of the lower and upper guide members 38 and 40 are spaced apart substantially in parallel from each other along the slot 22a in the front wall portion 22 of the casing structure 20 so that a horizontally elongated disc inlet and outlet slot 42 is formed between the edge portions 38b and 40b along and outside the slot 22a in the wall portion 22 of the casing structure 20. The disc guide structure 34 thus constructed and arranged is characterized firstly in that the guide structure 34 as a whole is elastically positioned with respect to the casing structure 20 by means of the compression springs 32 intervening between the casing and support structures 20 and 26. Secondly, the disc guide structure 20 is characterized in that the disc inlet and outlet slot 42 formed in the guide structure 34 is open outside of the front wall portion 22 of the casing structure 20. The guide structure 20 is further characterized in that the structure 20 is enclosed amlost in its entirety within the casing structure 20 although the disc inlet and outlet slot 42 is open outside the casing structure 20.

The disc inlet and outlet slot 42 formed between the respective outer edge portions 38b and 40b of the lower and upper guide members 38 and 40 is elongated in parallel with the lateral directions d' of the casing structure 20 and has a width which is not less than the diameter of audio and/or video recording discs of a maximum standardized diameter. As are well known in the art, audio and/or video recording discs presently available on a commercial basis are categorized in diameter into discs of three different diameters, viz., minimum-sized or 7-inch diameter recording discs, medium-sized or 10-inch diameter recording discs and maximum-sized or 12-inch diameter recording discs. Thus, the width of the disc inlet and outlet slot 42 provided in the embodiment of the disc loading and unloading system herein shown is assumed, by way of example, as being not less than about 12 inches or about 30 centimeters.

Figure 4:
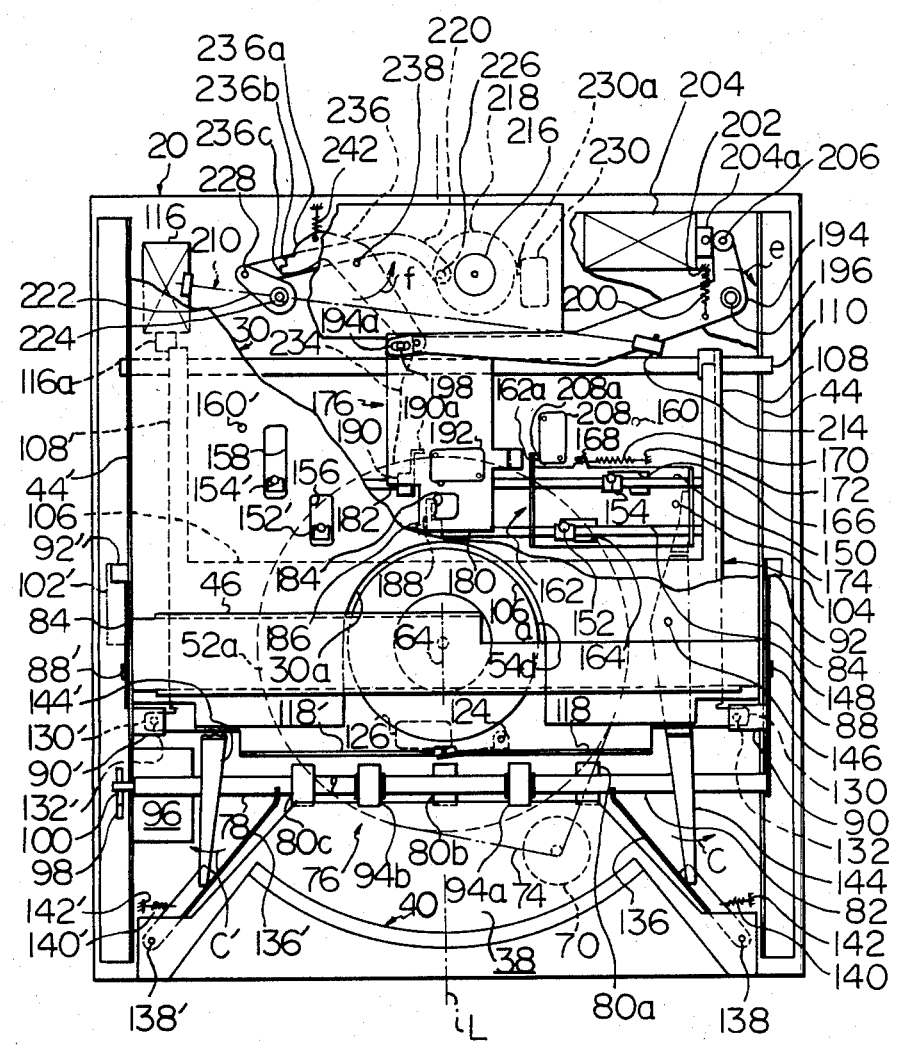
FIG. 4 is a partially cut-away plan view of a system embodying the present invention.

As will be best seen from FIG. 4 of the drawings, the upper chassis portion 30 of the support structure 26 is formed with a generally U-shaped recess 30a above an approximately central region of the lower chassis portion 28 of the support structure 26. The U-shaped recess 30a is open forwardly, viz., toward the front wall portion 22 of the casing structure 20 and has an arcuately curved rear end portion.

As will also be seen from FIG. 4, the support structure 26 further has a pair of side wall portions 44 and 44' which extend in parallel with the front-and-rear directions d (FIG. 1) of the casing structure 20 and which are spaced apart from each other in the lateral directions d' (FIG. 1) of the casing structure 20. The support structure 26 further includes a cross member 46 longitudinally extending in parallel with the lateral directions d' of the casing structure 20 and fixedly secured at its opposite ends to the side wall portions 44 and 44' of the support structure 26. As will be seen from FIGS. 2 and 3, the cross member 46 is upwardly spaced apart a certain distance from the upper face of the lower chassis portion 28 of the support structure 26 and has a longitudinally intermediate portion located above the U-shaped recess 30a in the upper chassis portion 30 of the support structure 26.

The automatic disc loading and unloading system embodying the present invention further comprises a disc support assembly 48. The disc support assembly 48 comprises a center shaft 50 upstanding from the lower chassis portion 28 of the support casing 26 and upwardly terminating below the U-shaped recess 30a in the upper chassis portion 30 of the casing 26 as will be best seen from FIG. 3. The center shaft 50 has coaxially supported thereon a generally drum-shaped flywheel 52 consisting of a circular disc portion, a ring-shaped outer rim portion 52a coaxially extending along the outer periphery of the disc portion and a central sleeve portion 52b projecting upwardly from the disc portion and formed with an axial blind bore which is open downwardly and closed at its upper end. The sleeve portion 52b of the flywheel 52 thus shaped is rotatably fitted to the center shaft 50 through the axial bore therein so that the flywheel 52 as a whole is coaxially rotatable on the center shaft 50.

Figure 5:
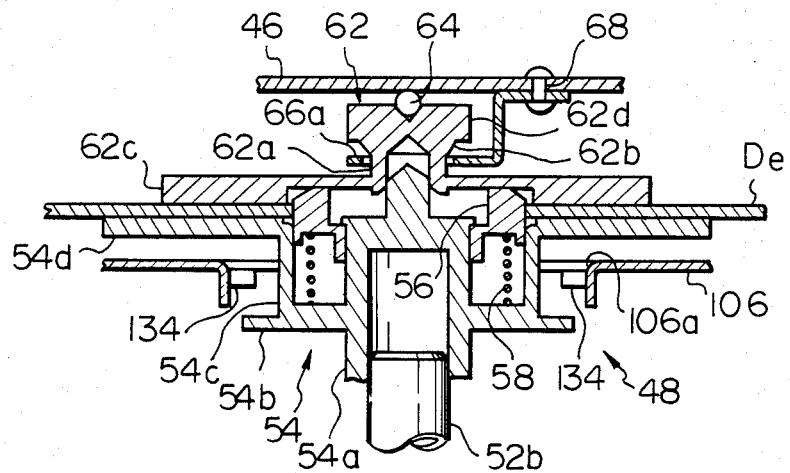
FIG. 5 is a vertical sectional view of a disc support assembly of a system embodying the present invention, the disc support assembly being shown with a donut-shaped recording disc fitted thereto.
Figure 6:
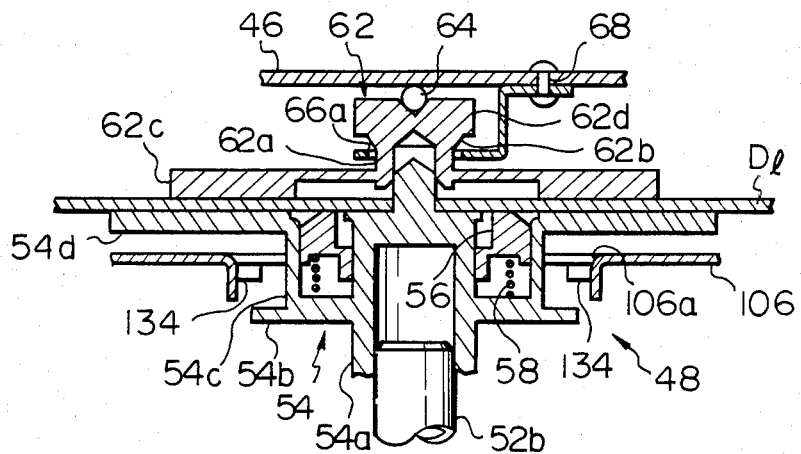
FIG. 6 is a view similar to FIG. 5 but shows a disc support assembly having a non-donut-shaped recording disc fitted thereto.

As illustrated more clearly in FIGS. 5 and 6 of the drawings, the disc support assembly 48 further comprises a turntable structure 54 having a central sleeve portion 54a formed with an axial blind bore, a circular flange portion 54b radially projecting outwardly from the sleeve portion 54a, a cylindrical drum portion 54c coaxially surrounding and radially spaced apart outwardly from the sleeve portion 54a, an annular table portion 54d radially projecting outwardly from the upper end of the drum portion 54c and upwardly spaced apart from the flange portion 54b which projects radially outwardly from the lower end of the drum portion 54c, and a spindle portion 54e axially projecting upwardly from the central sleeve portion 54a. The sleeve portion 54a, flange portion 54b, drum portion 54c, table portion 54d and spindle portion 54e have a common center axis. The axial blind bore formed in the central sleeve portion 54a is open downwardly and closed at its upper end and has a center axis which is substantially coincident with the common center axis of the portions 54a to 54e. The central sleeve portion 54a and the annular table portion 54d respectively have horizontal flat upper faces which are substantially flush with each other. Between the sleeve portion 54a and the drum portion 54c is formed a concavity which is open upwardly and which has an annular cross section substantially coaxial with the portions 54a to 54d of the structure 54. The turntable structure 54 thus configured is assembled to the central sleeve portion 52b of the above described flywheel 52 with the sleeve portion 52b of the flywheel 52 fitted into the axial blind bore in the central sleeve portion 54a of the turntable structure 54 in such a manner that the sleeve portion 54a of the turntable structure 54 as a whole is axially movable on and with respect to the sleeve portion 52b of the flywheel 52 and is not rotatable on and with respect to the sleeve portion 52b of the flywheel 52 which is rotatable on the center shaft 50 about the center axis of the shaft 50.

The disc support assembly 48 further comprises an extended-playing-disc or "EP" adapter 56 formed with an axial bore and having a circular rim portion substantially coaxial with the axial bore. The EP adapter 56 is axially slidably fitted to the sleeve portion 54a of the turntable structure 54 through the axial bore in the adapter 56 and is axially movable in the above mentioned concavity between the sleeve portion 54a and the drum portion 54c of the turntable structure 54. The outer rim portion of the EP adapter 56 thus arranged has a diameter equal to the diameter of the center holes in donut-shaped audio and/or video recording discs such as extended-playing or "EP" discs having center holes with 1.5-inch diameters. The inside diameter of the drum portion 54c of the turntable structure 54, viz., the outside diameter of the concavity between the sleeve portion 54a and the drum portion 54c of the turntable structure 54 is not less than the diameter of such a rim portion of the EP adapter 56.

The EP adapter 56 is urged to axially move upwardly with respect to the turntable structure 54 by suitable biasing means such as a helical compression spring 58 which is coaxially positioned within the concavity between the sleeve and drum portions 54a and 54c of the turntable structure 54 and which is seated at one end thereof on the upper face of the flange portion 54b of the turntable structure 54 and at the other end thereof on the lower face of the EP adapter 56. When a donut-shaped recording disc such as an extended-playing disc De is placed on the upper face of the table portion 54d of the turntable structure 54 in such a manner as to have its center axis aligned with the center axis of the turntable structure 54, the EP adapter 56 partially projects upwardly through the center hole in the recording disc De and holds the disc in correct position on the table portion 54d of the turntable structure 54, as shown in FIG. 5.

Figure 3:
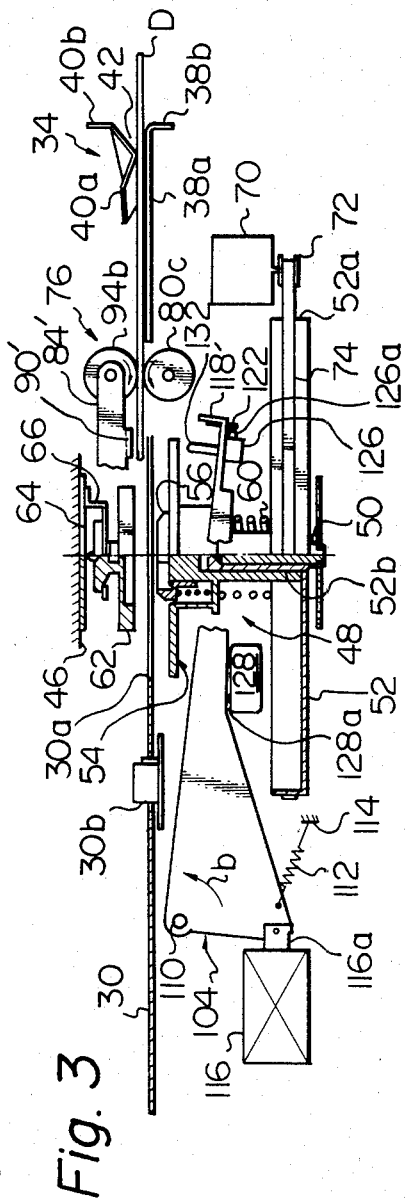
FIG. 3 is a partially cross sectional and partially side elevational view of an embodiment of a system according to the present invention with some of the component structures, units and members of the system omitted therefrom for simplicity of illustration.

The turntable structure 54 thus carrying the EP adapter 56 thereon is urged to axially move upwardly with respect to the flywheel 52 by suitable biasing means such as a helical compression spring 60 which is positioned to coaxially surround the central sleeve portion 52b of the flywheel 52 and which is seated at one end thereof on the upper face of the disc portion of the flywheel 52 and at the other end thereof on the lower face of the flange portion 54b of the turntable structure 54, as shown in FIGS. 2 and 3. The spring constant of the compression spring 60 thus arranged is selected in such a manner that the force urging the turntable structure 54 upwardly with respect to the flywheel 52 is larger than the sum of the weights of the turntable structure 54 and the members carried and to be carried on the turntable structure 54. On the other hand, the spring constant of the compression spring 58 associated with the EP adapter 56 is selected in such a manner that the force of the spring 58 urging the EP adapter 56 upwardly with respect to the turntable structure 54 is smaller than the weight of a non-donut-shaped recording disc such as an ordinary long-playing (LP) disc. When a long-playing recording disc is placed on the upper face of the table portion 54d of the turntable structure 54 with the spindle portion 54e of the turntable structure 54 passed through the center hole of the disc, the EP adapter 56 is pressed downwardly with respect to the turntable structure 54 against the force of the spring 58 and is downwardly moved in its entirety into the concavity between the sleeve portion 54a and drum portion 54c of the turntable structure 54, as shown in FIG. 6 in which the non-donut-shaped recording disc is represented by Dl.

The center shaft 50 on the lower chassis portion 28 of the support structure 26 is located so that the turntable structure 54 is vertically movable through the previously described U-shaped recess 30a in the upper chassis 30 of the support structure 26, as will be best seen from FIG. 4.

The disc support assembly 48 further comprises a disc clamping member 62 which has a cylindrical sleeve portion 62a, an upwardly enlarged frusto-conical guide portion 62b merging upwardly out of the cylindrical sleeve portion 62a, a disc clamping disc portion 62c radially projecting outwardly from the cylindrical sleeve portion 62a, and an upper pivot portion 62d merging upwardly out of the frusto-conical guide portion 62b and larger in diameter than the sleeve portion 62b. The cylindrical sleeve portion 62a, frusto-conical guide portion 62b, disc clamping portion 62c and upper pivot portion 62d have a common center axis. The disc clamping member 62 is, furthermore, formed with an axial blind bore which is continuous in the sleeve and guide portions 62a and 62b and which is open downwardly and closed at its upper end, and a downwardly reduced conical concavity which is formed in the upper pivot portion 62d and which has a center axis substantially aligned with the center axis of the clamping member 62. The concavity thus formed in the upper pivot portion 62d of the disc clamping member 62 is open upwardly and has a rigid ball 64 received therein in such a manner that the ball 64 partially projects upwardly from the concavity. The disc clamping portion 62c of the disc clamping member 62 has a diameter which is not larger than the diameters of labelled central portions of ordinary audio and/or video recording discs.

The disc clamping member 62 is supported by a bracket member 66 which is fixedly attached to the lower face of the previously mentioned cross member 46 by suitable fastening means such as a pin 68. The bracket member 66 is formed with a central opening 66a which has a diameter substantially equal to the maximum outside diameter of the frusto-conical guide portion 62b of the clamping member 62. The clamping member 62 is fitted to the bracket 66 with its sleeve portions 62a and 62b received in and vertically passed through the opening 66a in the bracket member 68. The clamping member 62 is, thus, in its entirety vertically movable with respect to the overlying cross member 46 between an uppermost axial position having the ball 64 held in rollable contact with the lower face of the cross member 46 and having the clamping disc portion 62c spaced apart downwardly from the bracket member 66 as shown in FIGS. 5 and 6, and a lowermost axial position having the upper pivot portion 62d of the clamping member 62 resting on the upper face of the bracket member 66 and having the ball 64 spaced apart downwardly from the lower face of the cross member 46 as shown in FIG. 3. The bracket member 66 is arranged on the cross member 46 so that, when the disc clamping member 62 is held in the lowermost axial position thereof, the center axis of the clamping member 62 is correctly aligned with the center axis of the turntable structure 54 positioned below the disc clamping member 62. When the turntable structure 54 is permitted to axially move upwardly by the force of the spring 60 with the table portion 54d of the structure 54 positioned above the U-shaped recess 30a in the upper chassis portion 30 of the support structure 28, the spindle portion 54e of the turntable structure 54 is axially received in the downwardly open blind bore in the disc clamping member 62.

The turntable structure 54 is driven for rotation about the center axis of the shaft 50 by suitable turntable drive means which is shown in FIGS. 3 and 4 as comprising a motor 70 having a wharve 72 fixedly carried on the output shaft of the motor 70, and an endless drive belt 74 passed between the wharve 72 and the outer rim portion 52a of the flywheel 52. The flywheel 52, turntable structure 54 and EP adapter 56 are, thus, driven together for rotation about the center axis of the center shaft 50 when the motor 70 is in operation. The motor 70 is supported by suitable bracket means (not shown) secured to the support structure 26.

The automatic disc loading and unloading system embodying the present invention further comprises a disc transfer mechanism 76 adapted to automatically transfer a recording disc D from the disc guide structure 34 to the turntable structure 54 or backwardly from the turntable structure 54 to the disc guide structure 34 during operation of the playback apparatus.

Figure 7:
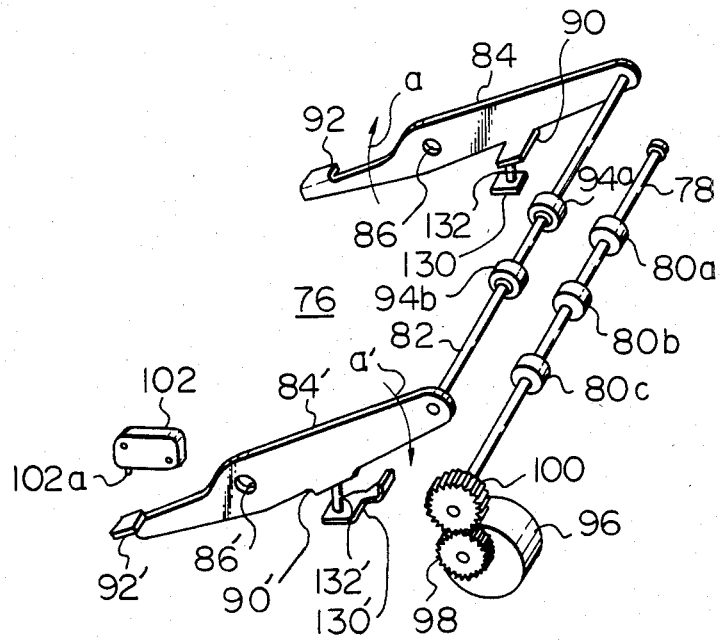
FIG. 7 is an exploded and fragmentary perspective view showing a disc transfer mechanism of a system embodying the present invention.

As illustrated in FIGS. 2 to 4 and further in FIG. 7 of the drawings, the disc transfer mechanism 76 comprises a drive shaft 78 axially extending substantially in parallel with the lateral directions d' (FIG. 1) of the casing structure 20 and having opposite axial end portions journaled in the side wall portions 44 and 44' (FIG. 4) of the support structure 26. The drive shaft 78 has coaxially secured thereon a suitable number of drive rollers which are shown, by way of example, consisting of three drive rollers 80a, 80b and 80c which are equidistantly spaced apart from each other in the axial direction of the shaft 78. One of the drive rollers such as the drive roller 80b as shown is preferably located in such a manner that the center plane of the roller is substantially in alignment with the center axis of the turntable structure 54 in a direction parallel with the front-and-rear directions d (FIG. 1) of the casing structure 20, as will be seen from FIG. 4. The other two of the rollers such as the drive rollers 80a and 80c as shown are preferably located so that the distance between the respective outer end faces of the particular two rollers is smaller than the standardized diameter of small-sized or 7-inch diameter recording discs.

The disc transfer mechanism 76 further comprises a guide roller shaft 82 axially extending substantially in parallel with and located generally above the drive shaft 78. The guide roller shaft 82 is secured or journaled at or adjacent its opposite axial ends on a pair of rockable levers 84 and 84' having intermediate fulcrum portions formed with circular holes 86 and 86' as shown in FIG. 7. The rockable levers 84 and 84' are spaced apart in parallel from each other in a direction parallel with the lateral directions d' (FIG. 1) of the casing structure 20 and are rotatably mounted on pins 88 and 88', respectively, which are secured to the side wall portions 44 and 44' (FIG. 4) of the support structure 28 and which are axially passed through the above mentioned holes 86 and 86' in the levers 84 and 84', respectively. Thus, the rockable levers 84 and 84' have substantially aligned axes of rotation which are substantially parallel with the lateral directions d' (FIG. 1) of the casing structure 20 and which are substantially aligned with the respective center axes of the above mentioned pins 88 and 88'.

Each of the rockable levers 84 and 84' has front and rear arm portions respectively merging forwardly and rearwardly from the intermediate fulcrum portion of the lever. The rockable lever 84 further has a front lateral lug portion 90 which is shown projecting sidewise inwardly from the front arm portion of the lever 84 and a rear lateral lug portion 92 which is shown projecting sidewise outwardly from the rear arm portion of the lever 84. Likewise, the rockable lever 84' has a front lateral lug portion 90' which is shown projecting sidewise inwardly from the front arm portion of the lever 84' and a rear lateral lug portion 92' which is shown projecting sidewise outwardly from the rear arm portion of the lever 84'.

The guide roller shaft 82 has coaxially mounted thereon a suitable number of guide rollers which are rotatable on the shaft 82 about the center axis of the shaft 82 and which are shown consisting of two guide rollers 94a and 94b which are spaced apart a predetermined distance from each other in the axial direction of the shaft 82. The guide rollers 94a and 94b are rotatable on the guide roller shaft 82 independently of each other but are axially held in position on the shaft 82 in such a manner as to be located in staggered or alternate relationship to the drive rollers 80a, 80b and 80c on the drive shaft 78 as will be best seen from FIG. 4.

The drive shaft 78 and accordingly the drive rollers 80a, 80b and 80c thereof are driven for rotation about the center axis of the shaft 80 by suitable drive means which is shown comprising a motor 96, a drive gear 98 coaxially secured to and rotatable with the output shaft of the motor 96, and a driven gear 100 which is held in mesh with the drive gear 98 and which is coaxially secured to and rotatable with the drive shaft 78. In FIG. 4 of the drawings, the motor 96 is shown positioned adjacent the side wall portion 44' of the support structure 26 and the drive shaft 78 is shown projecting outwardly from the side wall portion 44' and carring the driven gear 100 mounted on its projecting axial end portion. The motor 96 is supported by suitable bracket means (not shown) secured to the support structure 26.

Each of the drive rollers 80a, 80b and 80c and the guide rollers 94a and 94b has a frictional outer peripheral surface. In this instance, the material forming the frictional outer peripheral surface of each of the drive rollers 80a, 80b and 80c and the material forming the frictional outer peripheral surface of each of the guide rollers 94a and 94b are preferably selected so that the coefficient of friction of the latter is smaller than the coefficient of friction of the former for the reason that will be understood as the description proceeds.

Above the rear lug portion of one of the rocking levers such as the rear lug portion 92' of the rockable lever 84' as shown is positioned a first switch unit 102 having an actuating plunger 102a directed downwardly toward the lug portion 92'. The actuating plunger 102a of the switch unit 102 is biased to axially project downwardly for holding the switch unit 102 in a closed condition. The first switch unit 102 is, thus, herein assumed to be of the normally-closed type. The rockable lever 84' is rotatable about the axis of rotation thereof into and out of an angular position having its rear lug portion 92' brought into pressing contact with the actuating plunger 102a of the switch unit 102. The switch unit 102 is thus brought into an open condition when the rockable lever 84' is turned into such an angular position.

Figure 8:
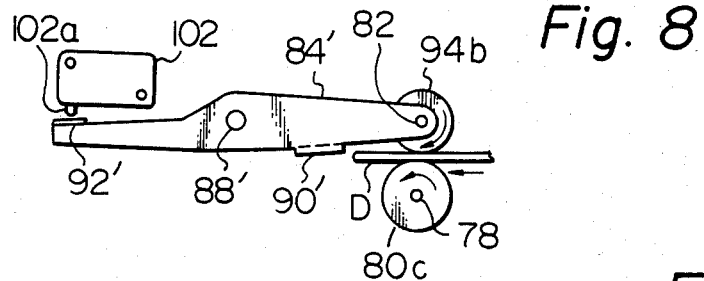
FIG. 8 is a side elevation view showing part of the disc transfer mechanism of FIG. 7 in one condition thereof.
Figure 9:
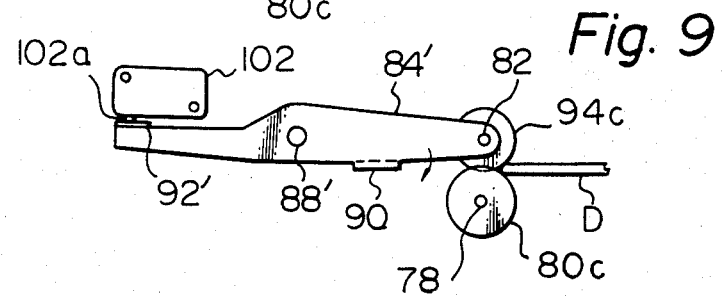
FIG. 9 is a view similar to FIG. 8 but showing the disc transfer mechanism in another condition thereof.

The guide roller shaft 82 having the guide rollers 94a and 94b carried thereon is connected at or adjacent its opposite axial ends to the respective front arm portions of the rockable levers 84 and 84'. The weights of the guide roller shaft 82 and the guide rollers 94a and 94b are thus borne by the front arm portions of the rockable levers 84 and 84' with the result that the rockable levers 84 and 84' are biased to turn clockwise in FIGS. 2 and 3 about the aligned axes of rotation of the levers 84 and 84', viz., in directions having their respective front arm portions inclined downwardly as indicated by arrows a and a' in FIG. 7. If, in this instance, there is a recording disc D carried on the drive rollers 80a, 80b and 80c on the drive shaft 78, the rockable levers 84 and 84' extend substantially horizontally with the guide rollers 94a and 94b positioned on the recording disc D as shown in FIG. 8 of the drawings. When the rockable levers 84 and 84' are held in such positions, the rear lug portion 92' of the rockable lever 84' is spaced apart downwardly from the actuating plunger 102a of the first switch unit 102, which is therefore held in the closed condition thereof. If, however, there is no recording disc carried on the drive rollers 80a, 80b and 80c on the drive shaft 78, the rockable levers 84 and 84' are permitted to further turn in the directions of the arrows a and a' (FIG. 7) about the aligned axes of rotation thereof until the rockable lever 84' is turned into the above mentioned angular position having its rear lug portion 92' brought into pressing contact with the actuating plunger 102a of the first switch unit 102 and causes the switch unit 102 to open. When the rockable lever 84' is turned together with the rockable lever 84 into such an angular position, the guide rollers 94a and 94b on the guide roller shaft 82 carried by the rockable levers 84 and 84' are moved into positions partially overlapping the drive rollers 80a, 80b and 80c on the drive shaft 78 when viewed from one side of the support structure 26, as shown in FIG. 9.

The automatic disc loading and unloading system embodying the present invention further comprises a tiltable platform structure 104 having a flat front wall portion 106 extending below the upper chassis portion 30 of the support structure 26 and a pair of rear arm portions 108 and 108' extending rearwardly from the front wall portion 106 and spaced apart substantially in parallel from each other in a direction substantially parallel with the lateral directions d' (FIG. 1) of the casing structure 20 as shown in FIG. 4. The front wall portion 106 is formed with an opening 106a (FIGS. 2 to 4) for allowing the table portion 54d of the turntable structure 54 to move upwardly and downwardly through the opening 106a. The side arm portions 108 and 108' of the platform structure 104 are pivotally or securely connected at or adjacent their respective rear ends to a cross shaft 110 extending in a direction substantially parallel with the lateral directions d' of the casing structure 20. The cross shaft 110 is rotatably supported at or adjacent its opposite axial ends on the side wall portions 44 and 44' of the support structure 26 and is thus rotatable about its center axis with respect to the support structure 26. The tiltable platform structure 104 as a whole is, thus, rotatable about the center axis of the cross shaft 110 with respect to the support structure 26 and is biased to turn about the center axis of the cross shaft 110 counter-clockwise in each of FIGS. 2 and 3 as indicated by arrow b therein and to incline upwardly from the cross shaft 110 by suitable biasing means. In FIGS. 2 and 3 of the drawings, such biasing means is shown comprising a preloaded helical tension spring 112 which is anchored at one end thereof to one of the side arm portions such as the side arm portion 108' of the platform structure 104 and at the other end thereof to the lower chassis portion 30 of the support structure 26 or any anchor means secured to the chassis portion 30 as indicated at 114.

Suitable drive means is provided to enable the tiltable platform structure 104 to turn out of the above mentioned angular position thereof against the force of the tension spring 112. In FIGS. 2 to 4 of the drawings, such drive means is shown comprising a solenoid-operated drive unit 116 including a plunger 116a pivotally connected to one of the rear arm portions such as the rear arm portion 108' of the platform structure 104. The solenoid-operated drive unit 116 is adapted to allow the plunger 116a to axially project forwardly when electrically de-energized and to cause the plunger 116a to axially retract rearwardly when electrically energized. Thus, the platform structure 104 is caused to tilt upwardly into a certain angularly raised position with respect to the support structure 26 from and about the center axis of the cross shaft 110 by the force of the spring 112 when the solenoid-operated drive unit 116 is de-energized. When the drive unit 116 is electrically energized, the plunger 116a of the drive unit 116 is caused to retract rearwardly and causes the platform structure 104 to turn downwardly from such a raised angular position until the platform structure 104 is turned into a predetermined lower limit angular position about the center axis of the cross shaft 110.

The tiltable platform structure 104 forms, firstly, part of disc advance blocking means for blocking the movement of a recording disc D advancing from the disc guide structure 34 toward the turntable structure 54 if the recording disc D is being moved in an incorrect direction with respect to the axis of rotation of the turntable structure 54 or if the recording disc is inserted into the playback apparatus during operation thereof. The incorrect direction as above mentioned is a direction in which the center axis of the recording disc being moved with respect to the platform structure 104 is not strictly aligned with the axis of rotation of the turntable structure 54 in a direction parallel with the front-and-rear directions d (FIG. 1) of the casing structure 20. The correct direction of a recording disc being conveyed from the disc guide structure 34 toward the turntable structure 54 is, thus, defined as the direction in which the center axis of the recording disc being moved toward the turntable structure 54 is contained in a predetermined vertical plane which contains the axis of rotation of the turntable structure 54 and which is substantially parallel with the front-and-rear directions d of the casing structure 20. If FIG. 4 of the drawings, such a plane is indicated by a phantom line L.

To form part of such locking means, the tiltable platform structure 104 has a pair of upstanding edge portions 118 and 118' projecting upwardly from the front end of the front wall portion 106 of the platform structure 103 and extending in line with each other in a direction substantially parallel with the lateral directions d' (FIG. 1) of the casing structure 20, as will be seen from FIGS. 2 to 4. The upstanding edge portions 118 and 118' of the platform structure 104 are spaced apart from each other symmetrically with respect to the above mentioned vertical plane L and, thus, have formed therebetween a gap 120 which is elongated substantially equidistantly in opposite lateral directions from the vertical plane L as will be better seen from FIG. 10 of the drawings. When the platform structure 104 is held in the above mentioned raised angular position with respect to the support structure 26, the upstanding edge portions 118 and 118' of the platform structure 104 are located horizontally at the rear of the horizontal inner panel portion 38a of the lower guide member 38 of the disc guide structure 34 and have their upper ends located on a plane slightly higher than the plane on which the flat upper face of the inner panel portion 38a of the guide member 38 lies, as will be seen from FIG. 2. If and when a recording disc is advancing ahead of the platform structure 104 in an incorrect direction toward and with respect to the axis of rotation of the turntable structure 54 as indicated by Da in FIG. 7, the disc is brought into abutting contact at its leading end with one of the upstanding edge portions such as the edge portion 118' as shown of the platform structure 104 and is prevented from advancing beyond the edge portions 118 and 118'.

The tiltable platform structure 104 further forms part of detecting means for detecting advancement of a recording disc in a correct direction toward and with respect to the axis of rotation of the turntable structure 54. Such detecting means comprises a detector element 122 pivotally attached at or adjacent one end thereof to the lower face of the flat front wall portion 106 of the tiltable platform structure 104 by means of a pivotal pin 124 having a center axis substantially normal to the face of the portion 106, as will be best seen from FIGS. 4 and 10. The detector element 122 extends generally in a direction parallel with the lateral directions d' (FIG. 1) of the casing structure 20 and projects into the above mentioned gap 120 between the upstanding edge portions 118 and 118' of the platform structure 104. The detector element 124 is thus pivotally movable about the center axis of the pin 124 and has a free leading end portion movable partially in the gap 120 in a direction approximately parallel with the front-and-rear directions d (FIG. 1) of the casing structure 20. The detecting means further comprises a second switch unit 126 having an actuating plunger 126a and fixedly attached to the lower face of the front wall portion 106 of the platform structure 104. The switch unit 126 is positioned on the front wall portion 106 of the platform structure 104 in such a manner that the actuating plunger 126 thereof axially projects forwardly toward the above mentioned free leading end portion of the detector element 122 so that the detector element 122 is engageable at the rear face of the leading end portion thereof with the actuating plunger 126a. The actuating plunger 126a of the switch unit 126 is biased to axially protrude forwardly into engagement at its leading end with the free leading end portion of the detector element 122. The switch unit 126 is constructed and arranged to remain in an open condition with the actuating plunger 126a held in a forwardly protruded axial position and to be closed when the actuating plunger 126a is caused to axially retract forwardly. The switch unit 126 thus constructed as being of the normally-open type is electrically connected between a suitable power source (not shown) and each of the previously described motor 70 forming part of the drive means for the turntable structure 54 and the previously described solenoid-operated drive unit 116 connected to the platform structure 104.

Figure 10:
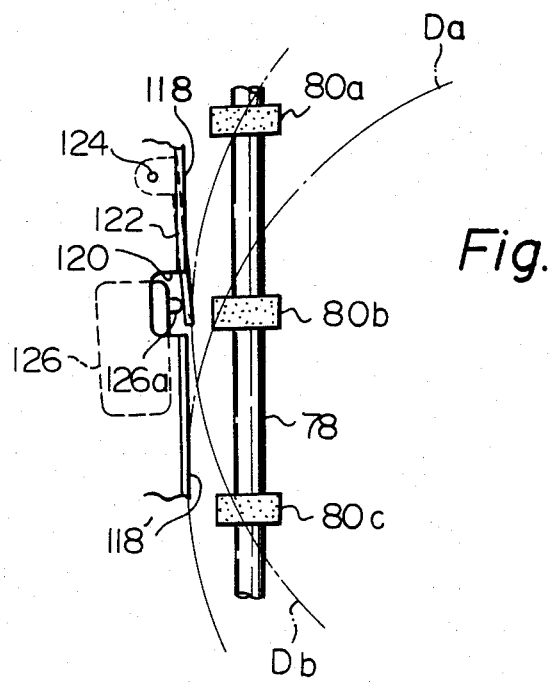
FIG. 10 is a fragmentary plan view showing an arrangement of a disc-advance and withdrawal detecting means forming part of an automatic disc loading and unloading system embodying the present invention.

When, thus, a recording disc being moved rearwardly from the disc guide mechanism 34 is advancing ahead of the tiltable platform structure 104 in a correct direction toward and with respect to the axis of rotation of the turntable structure 54 as indicated by Db in FIG. 10, the disc is brought into abutting contact with the free leading end portion of the detector element 122 on the platform structure 104 and forces the detector element 122 to turn rearwardly about the center axis of the pivotal pin 124. The detector element 122 in turn is therefore brought into pressing engagement with the actuating plunger 126a of the second switch unit 126 and causes the switch unit 126 to close. The switch unit 126 being thus closed, each of the motor 70 of the drive means for the turntable structure 54 and the solenoid-operated drive unit 116 for the platform structure 104 is energized. The solenoid-operated drive unit 116 is therefore actuated to cause the plunger 116a to retract rearwardly and drives the platform structure 104 to turn downwardly from the previously mentioned raised angular position thereof into the previously mentioned lower limit angular position thereof about the center axis of the cross shaft 110 against the force of the tension spring 112. With the platform structure 104 thus turned into the lower limit angular position thereof with respect to the support structure 26, the upstanding edge portions 118 and 118' of the platform structure 104 and the detector element 122 attached to the front wall portion 106 of the platform structure 104 are downwardly withdrawn from the travelling path of the recording disc advancing in a correct direction toward the axis of rotation of the turntable structure 54. The recording disc being moved rearwardly from the disc guide mechanism 34 is permitted to clear over the upstanding edge portions 118 and 118' of the platform structure 104 and to advance closer to the turntable structure 54. The second switch unit 126 of the correct-advance detecting means constructed and arranged as hereinbefore described is incorporated in an electric control circuit (not shown) which is arranged in such a manner that the solenoid-operated drive unit 116 can not be connected to the power source therefor if and when the switch unit 126 is closed during operation of the playback apparatus with a recording disc already transferred to and positioned on the turntable structure 54. This is useful for avoiding double loading of recording discs in the playback apparatus.

The tiltable platform structure 104 further forms part of withdrawal detecting means for detecting the withdrawal of the upstanding edge portions 118 and 118' of the platform structure 104 and the detector element 122 on the platform structure 104 out of the positions obstructing the advancing movement of a recording disc from the disc guide structure 34 toward the turntable structure 54. For this purpose, the platform structure 104 per se is associated with a third switch unit 128 which is fixedly supported on suitable bracket means (not shown) secured to the support structure 26 and which has an actuating plunger 128a. The third switch unit 128 is arranged in such a manner that the actuating plunger 128a thereof axially projects upwardly toward and engageable at its upper end with a suitable portion such as the rear arm portion 108' of the platform structure 104 as will be seen from FIG. 3. The switch unit 128 is constructed and arranged to remain in an open condition with the actuating plunger 128a axially protruded upwardly and in a closed condition with the actuating plunger 128a axially retracted downwardly. The actuating plunger 128a is biased to project upwardly and, thus, the third switch unit 128 is assumed as being of the normally-open type.

When the tiltable platform structure 104 is held in the previously mentioned raised angular position thereof, the rear arm portion 108' of the structure 104 is upwardly spaced apart and accordingly disengaged from the actuating plunger 128a of the switch unit 128, which is therefore held in the open condition thereof with the actuating plunger 128a held in the upwardly protruded position. When, however, the tiltable platform structure 104 is caused to tilt downwardly about the center axis of the cross shaft 110 by the action of the solenoid-operated drive unit 116 against the force of the tension spring 122 as previously described, the rear arm portion 108' of the platform structure 104 is brought into downwardly pressing engagement with the actuating plunger 128a of the switch unit 128 and causes the switch unit 128 to close. The third switch unit 128 is electrically connected between a suitable power source (not shown) and the motor 96 forming part of the drive means for the disc transfer mechanism 76. The downwardly tilting motion of the platform structure 104 about the center axis of the cross shaft 110 is limited by the engagement of the platform structure 104 with the actuating plunger 128a of the third switch unit 128. The platform structure 104 is thus permitted to reach the previously mentioned lower limit angular position thereof when the platform structure 104 is supported in weight transmitting relationship on the actuating plunger 128a of the switch unit 128.

The tiltable platform structure 104 of the automatic disc loading and unloading system embodying the present invention further forms part of roller lifting means for lifting the guide rollers 94a and 94b upwardly away from the drive shaft 78 of the disc transfer mechanism 76 when the platform structure 104 is turned into the raised angular position thereof about the center axis of the cross shaft 110. Such roller lifting means is shown comprising a pair of lateral lug portions 130 and 130' projecting sidewise outwardly from the front wall portion 106 of the platform structure 104 as shown in FIG. 4 and a pair of pins 132 and 132' upstanding from the lateral lug portions 130 and 130', respectively. The lateral lug portions 130 and 130' of the platform structure 104 are located so that the pins 132 and 132' respectively upstanding therefrom project toward and engageable at their upper ends with the front lateral lug portions 90 and 90' of the rockable levers 84 and 84', respectively, of the disc transfer mechanism 76.

When the platform structure 104 is held in the above mentioned lower limit angular position thereof about the center axis of the cross shaft 110 as shown in FIG. 3, the pins 132 and 132' on the platform structure 104 are located below the lateral lug portions 90 and 90' of the rockable levers 84 and 84' of the disc transfer mechanism 76. Under these conditions, the rockable levers 84 and 84' are permitted to turn in the directions of the arrow a and a' (FIG. 7) due to the weights of the guide roller shaft 82 and the guide rollers 94a and 94b supported by the respective front arm portions of the rockable levers 84 and 84' as previously described. When the platform structure 104 is driven to turn upwardly about the center axis of the cross shaft 110 by means of the helical tension spring 112, the pins 132 and 132' on the platform structure 104 are moved upwardly into pressing engagement with the lateral lug portions 90 and 90' of the rockable levers 84 and 84', respectively. The rockable levers 94 and 84' are therefore caused to turn about their aligned axes of rotation in the directions opposite to the directions of the arrows a and a' until the platform structure 104 reaches the previously mentioned raised angular position thereof about the center axis of the cross shaft 110.

The tiltable platform structure 104 still further forms part of turntable lowering means operative to move the turntable structure 54 downwardly away from the disc clamping member 62 of the disc support assembly 48 when the platform structure 104 is turned downwardly about the center axis of the cross shaft 110 into the lower limit angular position thereof. To serve as such means, the platform structure 104 has fixedly mounted thereon or is formed with a suitable number of pins 134 projecting radially inwardly into the opening 106a in the front wall portion 106 of the platform structure 104, as shown in FIGS. 5 and 6 of the drawings. The pins 134 individually extend toward the drum portion 54c of the turntable structure 54 so as to be engageable with the upper face of the flange portion 54b of the turntable structure 54.

When, thus, the platform structure 104 is held in the raised angular position thereof, the pins 134 on the platform structure 104 are upwardly spaced apart from or disengaged from the upper face of the flange portion 54b of the turntable structure 54, which is accordingly allowed to move upwardly into or stay in a raised axial position engageable or held in engagement with the disc clamping member 62 by the force of the compression spring 60. When, however, the platform structure 104 is driven to turn downwardly about the center axis of the cross shaft 110 by the solenoid-operated drive unit 116, the pins 134 on the front wall portion 106 of the platform structure 104 are brought into downwardly pressing engagement with the upper face of flange portion 54b of the turntable structure 54 and causes the turntable structure 54 to move downwardly on the central sleeve portion 52b of the flywheel 52 against the force of the compression spring 60 as will be seen from the illustration of FIG. 3.

The automatic disc loading and unloading system embodying the present invention further comprises a disc-size discriminating mechanism operative to discriminate the size of the recording disc D being inserted into the casing structure 20 through the disc guide structure 34. In FIG. 4 of the drawings, such a disc-size discriminating mechanism is shown comprising a pair of pivotal wing plates 136 and 136' which are pivotally mounted on the lower chassis portion 28 of the support structure 26 by pins 138 and 138', respectively. The pins 138 and 138' are located adjacent the opposite lateral ends of a front end area of the lower chassis portion 28 of the support structure 26 and axially project vertically from the upper face of the chassis portion 28 so that the wing members 136 and 136' are rotatable about the vertical center axes of the pins 138 and 138', respectively. The pins 138 and 138' are, furthermore, located substantially in symmetry with respect to the vertical plane L. The wing members 136 and 136' are also located and arranged substantially symmetrically with respect to the plane L and extend rearwardly with respect to the lower chassis portion 28 of the support structure 26 and laterally inwardly of the chassis portion 28 toward the vertical plane L. The wing members 136 and 136' thus arranged are urged by suitable biasing means to turn laterally outwardly with respect to the lower chassis portion 28 of the support structure 26 away from the vertical plane L. In FIG. 4, such biasing means is shown comprising preloaded helical tension springs 140 and 140' which are anchored each at one end to the wing members 136 and 136', respectively, and at the other ends thereof to suitable anchor means secured as at 142 and 142' to the support structure 26.

The above mentioned disc-size discriminating mechanism further comprises a pair of rockable levers 144 and 144' respectively having intermediate fulcrum portions pivotally mounted on pins 146 and 146', respectively, upstanding from the lower chassis portion 28 of the support structure 26 as shown in part in FIG. 2 and in part in FIG. 4. The rockable levers 144 and 144' are thus rockable about the vertical center axes of the pins 146 and 146', respectively, and extend generally in parallel with the front-and-rear directions d (FIG. 1) of the casing structure 20. Each of the rockable levers 144 and 144' further has front and rear arm portions respectively merging forwardly and rearwardly from the intermediate fulcrum portion of the lever. The respective front arm portions of the rockable levers 144 and 144' are held in slidable contact at their leading ends with the outer faces of the above described wing members 136 and 136', respectively, so that the rockable levers 144 and 144' are urged to turn in counter-clockwise and clockwise direction, respectively, in FIG. 4 about the center axes of the pins 146 and 146' as indicated by arrows c and c' in FIG. 4 by the forces of the tension springs 140 and 140' anchored to the wing members 136 and 136', respectively.

The automatic disc loading and unloading system embodying the present invention further comprises a disc positioning mechanism which is adapted to cooperate with the disc-size discriminating mechanism above described.

Figure 13:
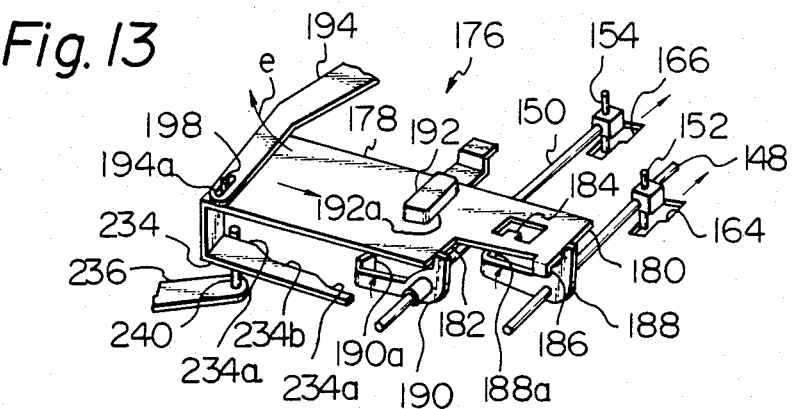
FIG. 13 is a fragmentary perspective view showing part of a selective positioning mechanism of a system embodying the present invention.

As illustrated in FIGS. 2 and 4 and further in FIGS. 11, 12 and 13 of the drawings, the disc positioning mechanism comprises first and second or front and rear pivotal shafts 148 and 150 which extend in directions substantially parallel with the lateral directions d' (FIG. 1) of the casing structure 20 and which are located rearwardly of the disc support assembly 48. The shafts 148 and 150 are spaced apart a predetermined distance from each other in the front-and-rear direction d of the casing structure 20. Each of the pivotal shafts 148 and 150 is rotatably connected at or adjacent its opposite lateral ends to suitable bracket members (not shown) secured to or integral with the upper chassis portion 30 of the support structure 26 and are rotatable independently of each other about their respective center axes with respect to the support structure 26. Each of the pivotal shafts 148 and 150 is, furthermore, urged to spin about the center axis thereof in a counter-clockwise direction in each of FIGS. 2 and 12 by suitable biasing means (not shown). The distance between the front and rear pivotal shafts 148 and 150 is selected to correspond to the difference between the diameters of the previously mentioned small-sized or 7-inch diameter recording discs and medium-sized or 10-inch diameter recording discs.

The front pivotal shaft 148 has fixedly mounted thereon a pair of disc stop elements or pins 152 and 152' axially projecting perpendicularly from the center axis of the shaft 148 and spaced apart a predetermined distance from each other substantially in symmetry with respect to the vertical plane L. Similarly, the rear pivotal shaft 150 has fixedly mounted thereon a pair of disc stop elements or pins 154 and 154' axially projecting perpendicularly from the center axis of the shaft 150 and spaced apart a predetermined distance from each other substantially symmetrically with respect to the vertical plane L. The upper chassis portion 30 of the support structure 26 is formed with a first pair of slots 156 and a second pair of slots 158 as will be seen from FIG. 4 in which only one of the slots 156 and only one of the slots 158 are shown. The pins 152 and 152' on the front pivotal shaft 148 are caused to project upwardly through the slots 156 or to tilt downwardly and rearwardly below the slots 156, depending upon the angular position of the shaft 148 about the center axis thereof. Likewise, the pins 154 and 154' on the rear pivotal shaft 150 are caused to project upwardly through the slots 158 or to tilt downwardly and rearwardly below the slots 158, depending upon the angular position of the shaft 150 about the center axis thereof. The above mentioned biasing means associated with each of the front and rear pivotal shafts 148 and 150 is adapted to urge each of the shafts 148 and 150 to turn in a direction to cause the pins 152 and 152' or the pins 154 and 154' to tilt downwardly and rearwardly about the center axis of the shaft 148 or 150. A third pair of disc stop elements or pins 160 and 160' are secured to or formed on the upper face of the upper chassis portion 30 of the support structure 26 as shown in FIG. 4. The pins 160 and 160' are located rearwardly of the pins 154 and 154' on the rear pivotal shaft 150 and are spaced apart a predetermined distance from each other in a direction substantially parallel with the lateral direction d' of the casing structure 20 (FIG. 1).

The pins 152 and 152' on the front pivotal shaft 148 are located with respect to the axis of rotation of the turntable structure 54 in such a manner that, when a small-sized or 7-inch diameter recording disc is positioned to have its outer circumferential edge contacted by both of the pins 152 and 152' projecting upwardly through the slots 156 in the upper chassis portion 30 of the support structure 26, the recording disc is correctly positioned with respect to the turntable structure 54 and has its center axis substantially aligned with the axis of rotation of the turntable structure 54. Likewise, the pins 154 and 154' on the rear pivotal shaft 150 are located with respect to the axis of rotation of the turntable structure 54 in such a manner that, when a medium-sized or 10-inch diameter recording disc is positioned to have its outer circumferential edge contacted by both of the pins 154 and 154' projecting upwardly through the slots 158 in the upper chassis portion 30 of the support structure 26, the particular recording disc is correctly positioned with respect to the turntable structure 54 and has its center axis substantially aligned with the axis of rotation of the turntable structure 54. On the other hand, the pins 160 and 160' on the upper chassis portion 30 of the support structure 26 are located with respect to the axis of rotation of the turntable structure 54 in such a manner that, when a large-sized or 12-inch diameter recording disc is positioned to have its outer peripheral edge contacted by both of the pins 160 and 160', then the particular recording disc is correctly positioned with respect to the turntable structure 54 and has its center axis substantially aligned with the axis of rotation of the turntable structure 54. Each of the pins 152 and 152' on the front pivotal shaft 148 and the pins 154 and 154' on the rear pivotal shaft 150 has a lower extension projecting generally downwardly from each of the shafts 148 and 150.

The selective disc positioning mechanism of the system embodying the present invention further comprises a pair of slider plates which are positioned immediately below and movable along the front and rear pivotal shafts 148 and 150 substantially in symmetrical relationship to each other with respect to the vertical plane L. The two slider plates are shaped and arranged essentially similarly to each other and, for this reason, only one of the slider plates, viz., the slider plate represented by reference numeral 162 in the drawings (particularly in FIGS. 4, 11 and 12) will be herein described.

The slider plate 162 is supported by suitable support means (not shown) in such a manner as to be movable immediately below and along the front and rear pivotal shafts 148 and 150 and is formed with first and second or front and rear slots 164 and 166 which are substantially similar in shape to each other. The front and rear slots 164 and 166 are respectively located immediately below and elongated along the front and rear pivotal shafts 148 and 150 and are further located in such a manner as to be capable of receiving therein the respective lower extensions of the pins 152 and 154 on the front and rear pivotal shafts 148 and 150, respectively. Each of the slots 164 and 166 in the slider plate 162 has a laterally inner small-area portion and a laterally outer large-area portion. The laterally inner small-area portion of the front slot 164 is sized so that, when the lower extension of the pin 152 on the front pivotal shaft 148 is received in the particular portion of the slot 164, the pin 152 is locked to the slider plate 162 and prevents the front lateral shaft 148 from turning about the center axis thereof. Similarly, the laterally inner small-area portion of the rear slot 166 is sized so that, when the lower extension of the pin 154 on the rear pivotal shaft 150 is received in the particular portion of the slot 166, the pin 154 is locked to the slider plate 162 and prevents the rear pivotal shaft 150 from turning about the center axis thereof. On the other hand, the laterally outer large-area portion of the front slot 164 is sized in such a manner that, when the pin 152 on the front pivotal shaft 148 is located immediately above the particular portion of the slot 164, the pin 152 is permitted to tilt downwardly and rearwardly about the center axis of the shaft 148 through the large-area portion of the slot 164. Similarly, the laterally outer large-area portion of the rear slot 166 is sized so that, when the pin 154 on the second pivotal shaft 150 is located immediately above the particular portion of the slot 166, the pin 154 is permitted to tilt downwardly and rearwardly about the center axis of the shaft 150 through the large-area portion of the slot 166. The small-area portion of the rear slot 166 is wider in lateral extent than that portion of the front slot 164.

As will be described in more detail, the slider plate 162 is thus movable selectively into any one of two operative lateral positions with respect to the upper chassis portion 30 of the support structure by means of the previously described disc-size discriminating mechanism when a medium-sized or 10-inch diameter recording disc or a large-sized or 12-inch diameter recording disc is fed into the playback apparatus.

The slider plate 162 thus constructed and arranged is urged to move laterally outwardly with respect to the upper chassis portion 30 of the support structure 26 by suitable biasing means. In FIG. 4, such biasing means is shown comprising a projection 168 formed on the slider plate 162 and a preloaded helical tension spring 170 which is anchored at one end thereof to the projection 168 and at the other end thereof to suitable anchor means secured as at 172 to the upper chassis portion 30 of the support structure 26. The slider plate 162 is prevented from being moved laterally outwardly beyond a predetermined laterally outermost limit position which is reached by the slider plate 162 with the pins 152 and 154 on the front and rear pivotal shafts 148 and 150 received in the laterally inner small-area portions of the front and rear slots 164 and 166, respectively, in the slider plate 162.

As will also be described in more detail, the slider plate 162 is permitted to stay in the above mentioned laterally outermost position thereof when a small-sized or 7-inch diameter recording disc is inserted into the playback apparatus.

The slider plate 162 has fixedly connected thereto or integrally formed with an elongated slider actuating element or pin 174 which is shown in FIGS. 2 and 12 as axially projecting downwardly from the lower face of the slider plate 162. The rockable lever 144 forming part of the previously described disc-size discriminating mechanism has its rear arm portion located laterally outwardly of the slider actuating pin 174 and held in pressing engagement with the pin 174 by means of the wing member 136 which is urged to turn the rockable lever 144 counter-clockwise in FIG. 4, viz., in the direction of the arrow c by the force of the preloaded tension spring 142.

When the slider plate 162 is held in the above mentioned laterally outermost limit position with respect to the upper chassis portion 30 of the support structure 26 with the rear arm portion of the rockable lever 144 held in pressing engagement with the slider actuating pin 174 as above described, the two wing members 136 and 136' of the disc-size discriminating mechanism are held, about the respective center axes of the pins 138 and 138', in such angular positions as to extend in directions to approach each other rearwardly with respect to the support structure 26. If, under these conditions, a small-sized or 7-inch diameter recording disc is inserted into the casing structure 20 through the disc guide structure 34, the disc is permitted to clear the wind members 136 and 136' without forcing the wing members to be spaced wider apart from each other. The slider plate 162 of the disc positioning mechanism is accordingly held at rest in the laterally outermost limit position thereof with respect to the upper chassis portion 30 of the support structure 26. If, however, a medium-sized or 10-inch diameter recording disc or a large-sized or 12-inch diameter recording disc is inserted into the casing structure 20 through the disc guide structure 34, the disc is brought into pressing and sliding contact with the respective inner faces of the wing members 136 and 136'. The wing members 136 and 136' are accordingly caused to turn laterally outwardly or away from the vertical plane L about the center axes of the pins 138 and 138' with the assistance of the tension springs 140 and 140' respectively anchored to the wing members 136 and 136'. Such a turning motion of the wing member 136 is transmitted through the rockable lever 144 and the slider actuating pin 174 to the slider plate 162 and causes the slider plate 162 to move laterally inwardly from the above mentioned laterally outermost limit position thereof along the front and rear pivotal shafts 162 and 162'. The slider plate 162 is thus caused to move into one of the above mentioned two operative lateral positions with respect to the upper chassis portion 30 of the support structure 26.

Thus, the disc-size discriminating mechanism of the system embodying the present invention is selectively responsive to different standardized sizes or diameters of recording discs to be transferred to the turntable structure 54 and is operative to determine the amount of displacement of the slider plate 162 from the laterally outermost limit position thereof depending upon the size of the recording disc inserted into the playback apparatus for reproducing purposes.

The automatic disc loading and unloading system embodying the present invention further comprises a switch carrier mechanism which is generally indicated at 176 in FIG. 1 and which is shown more clearly in FIG. 13 of the drawings. The switch carrier mechanism 176 comprises a horizontal switch carrier plate 178 which is positioned below the upper chassis portion 30 of the support structure 26 and above the horizontal plane common to the upper ends of the pivotal shafts 148 and 150 of the above described selective disc positioning mechanism. The switch carrier plate 178 is supported by suitable support means (not shown) secured to the upper chassis portion 30 of the support structure 26 and is longitudinally movable in a direction substantially parallel with the front-and-rear directions d (FIG. 1) of the casing structure 20. As will be best seen from FIG. 13 of the drawings, the switch carrier plate 178 has two front edge portions consisting of first and second front edge portions 180 and 182 which extend in directions substantially parallel with the lateral directions d' (FIG. 1) of the casing structure 20. The first front edge portion 180 is formed at the foremost end of the carrier plate 178, while the second front edge portion 182 is laterally offset from the first front edge portion 180 and is formed at a predetermined distance rearwardly of the first edge portion 180. The distance between the first and second front edge portions 180 and 182 in the front-and-rear directions d (FIG. 1) of the casing structure 20 is substantially equal to the distance between the respective center axes of the front and rear pivotal shafts 148 and 150 of the selective disc positioning mechanism. The switch carrier plate 178 is further formed with first and second downwardly projecting lug portions 184 and 186 which are offset from each other. The second lug portion 186 is located adjacent the first front edge portion 180 of the carrier plate 178 and the first lug portion 184 is located at a predetermined distance rearwardly from the second lug portion 186, as will be seen more clearly from FIG. 13 of the drawings.

The switch carrier mechanism of the system embodying the present invention further comprises first and second or front and rear carrier retaining members 188 and 190 which are fixedly mounted on and rotatable with the front and rear pivotal shafts 148 and 150, respectively. Thus, the pivotal shafts 148 and 150 form part of not only the previously described selective disc positioning mechanism but the switch carrier mechanism. Each of the first and second carrier retaining members 188 and 190 is configured in the form of a bell-crank lever and has an intermediate fulcrum portion secured to each of the front and rear pivotal shafts 148 and 150, a front arm portion merging generally upwardly out of the intermediate fulcrum portion, and a rear arm portion merging generally rearwardly out of the fulcrum portion. The first carrier retaining member 188 further has a hook portion 188a projecting laterally from the rear arm portion of the rear arm portion of the retaining member 188 and, likewise, the second carrier retaining member 190 further has a hook portion 190a which projects laterally from the rear arm portion of the retaining member 190. As will be best seen from the illustration of FIG. 4, the first carrier retaining member 188 is located on the front pivotal shaft 148 in such a manner as to have its front arm portion engageable at its rear end with the first front edge portion 180 of the switch carrier plate 178 and its hook portion 188a engageable at its front end with the rear edge of the first lug portion 184 of the carrier plate 178. On the other hand, the second carrier retaining member 190 is located on the rear pivotal shaft 150 in such a manner as to have its front arm portion engageable at its rear end with the second front edge portion 182 of the switch carrier plate 178 and its hook portion 190a engageable at its front end with the rear edge of the second lug portion 186 of the carrier plate 178.

Figure 14:
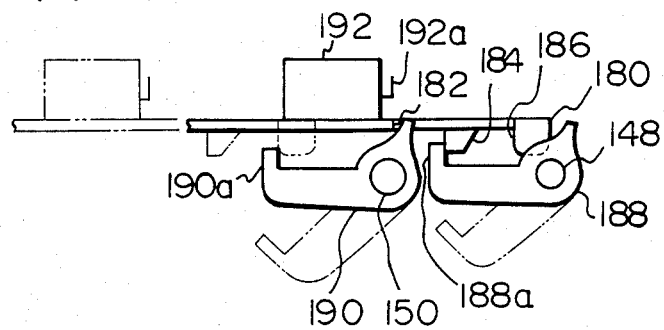
FIG. 14 is a side elevation view of the arrangement illustrated in FIG. 13.

The first carrier retaining member 188 is angularly positioned on the front pivotal shaft 148 in such a manner as to have its front arm portion directed upwardly and its rear arm portion directed rearwardly from the center axis of the shaft 148 as indicated by full lines in FIG. 14 when the pivotal shaft 148 assumes about the center axis thereof the angular position having the pins 152 and 152' (FIG. 4) directed upwardly from the center axis of the shaft 148. When the front pivotal shaft 148 is held, about the center axis thereof, in the angular position having the pins 152 and 152' tilted rearwardly from the center axis of the shaft 148, the first carrier retaining member 188 assumes about the center axis of the shaft 148 an angular position having its front arm portion inclined forwardly and its rear arm portion inclined downwardly from the center axis of the shaft 148 as indicated by phantom lines in FIG. 14. Likewise, the second retaining member 190 is angularly positioned on the rear pivotal shaft 150 in such a manner as to have its front arm portion directed upwardly and its rear arm portion directed rearwardly from the center axis of the shaft 150 as indicated by full lines in FIG. 14 when the pivotal shaft 150 assumes about the center axis thereof the angular position having the pins 154 and 154' (FIG. 4) directed upwardly from the center axis of the shaft 150. When, on the other hand, the second pivotal shaft 150 is held, about the center axis thereof, in the angular position having the pins 154 and 154' tilted rearwardly from the center axis of the shaft 150, then the second carrier retaining member 190 assumes about the center axis of the shaft 150 an angular position having its first arm portion inclined forwardly and its rear arm portion inclined downwardly from the center axis of the shaft 150 as indicated by phantom lines in FIG. 14.

The switch carrier plate 178 thus arranged with the first and second carrier retaining members 188 and 190 on the front and rear pivotal shafts 148 and 150, respectively, is longitudinally movable in a direction parallel with the front-and-rear directions d (FIG. 1) between predetermined foremost and rearmost limit positions through a predetermined intermediate longitudinal position with respect to the upper chassis portion 30 of the support structure 26 and accordingly to the front and rear pivotal shafts 148 and 150. The foremost limit position of the switch carrier plate 178 is reached when the first lug portion 184 of the carrier plate 178 is engaged at its rear edge by the hook portion 188a of the first carrier retaining member 188 as indicated by the full lines in FIG. 14. The intermediate longitudinal position of the switch carrier plate 178 is reached when the carrier plate 178 is moved rearwardly from the above mentioned foremost limit position thereof and the second lug portion 186 of the carrier plate 178 is engaged at its rear edge by the hook portion 190a of the second carrier retaining member 190 as indicated by the phantom lines in FIG. 14. When the switch carrier plate 178 is held in this intermediate longitudinal position, the front pivotal shaft 148 is held in the angular position having the first carrier retaining member 188 in the above mentioned angular position having its front arm portion inclined forwardly and its rear arm portion inclined downwardly from the center axis of the shaft 148. Furthermore, the rearmost limit position of the switch carrier plate 178 is reached when the carrier plate 178 is moved rearwardly from the above mentioned intermediate longitudinal position thereof and is brought into suitable stop means (not shown) secured to the support structure 26. The switch carrier plate 178 is urged to move rearwardly with respect to the support structure 26 and accordingly to the front and rear pivotal shafts 148 and 150 by suitable biasing means to be described.

The switch carrier plate 178 constructed and arranged as above described has fixedly supported on the upper face thereof a fourth switch unit 192 having an actuating plunger 192a projecting forwardly with respect to the support structure 26. The switch unit 192 is positioned on the switch carrier plate 178 in such a manner that the actuating plunger 192a thereof is located to be engaged by the leading ends of the outer circumferential edges of small-sized, medium-sized and large-sized or 7-inch, 10-inch and 12-inch diameter recording discs when the switch carrier plate 178 is held in the above described foremost limit position, intermediate longitudinal position and rearmost limit positions, respectively, thereof. The fourth switch unit 192 thus positioned on the switch carrier plate 178 is adapted to be closed with the actuating plunger 192a axially protruded forwardly with respect to the carrier plate 178 and to be open when the actuating plunger 192a is caused to axially retract rearwardly with respect to the carrier plate 178. The switch unit 192 is electrically connected, in conjunction with the previously (FIG. 3) described third switch unit 128, to the motor 96 of the drive means for the previously described disc transfer mechanism 76 (FIG. 7) and is arranged to disconnect the motor 76 from the above mentioned power source for the motor 96 when the actuating plunger 192a of the switch unit 192 is caused to axially retract rearwardly with respect to the switch carrier unit 192. The fourth switch unit 192 projects upwardly from the upper chassis portion 30 of the support structure 26 which is thus formed with an opening 30b (FIGS. 2 and 3) in the chassis portion 30 so as to accommodate the longitudinal movement of the switch unit 192 with respect to the upper chassis portion 30 of the support structure 26.

The automatic disc loading and unloading system embodying the present invention further comprises reset means which is adapted to render all the operational members, structures and units of the system into reset conditions upon completion of each playback operation or when it is desired to interrupt a playback operation.

In FIG. 4 of the drawings, such reset means is shown comprising a bell-crank lever 194 having an intermediate fulcrum portion rotatably mounted on a shaft 196 upstanding from the lower chassis portion 28 of the support structure 26 and thus having a vertical center axis. The bell-crank lever 194 further has a first arm portion merging out of the above mentioned intermediate fulcrum portion and directed toward a rear end portion of the above described switch carrier plate 178, and a rear arm portion merging out of the fulcrum portion and angularly spaced apart from the first arm portion of the lever 194. The first arm portion of the bell-crank lever 194 extends immediately above the rear end portion of the switch carrier plate 178 and has an elongated slot 194a formed adjacent its leading end. A pin 198 is secured to the switch carrier plate 178 and projects upwardly from the upper face of the carrier plate 178 and further through the elongated slot 194a in the first arm portion of the lever 194. The bell-crank lever 194 thus arranged is urged by suitable biasing means to turn about the vertical center axis of the shaft 196 in a clockwise direction in FIG. 4 as indicated by arrow e. In FIG. 4, the biasing means is shown comprising a preloaded hilical tension spring 200 which is anchored at one end thereof to the first arm portion of the bell-crank lever 194 and at the other end thereof to suitable anchor means secured as at 202 to the support structure 26.

With the bell-crank lever 194 thus urged to turn about the center axis of the shaft 196 in the direction of the arrow e in FIG. 4, the switch carrier plate 178 engaged by the first portion of the lever 194 through the pin 198 is urged to longitudinally move rearwardly with respect to the upper chassis portion 30 of the support structure 26. The tension spring 200 forming part of the reset means on one hand constitutes on the other hand the previously mentioned biasing means for the switch carrier plate 178.

The reset means of the system embodying the present invention further comprises a solenoid-operated drive unit 204 having a movable plunger 204a and supported on suitable bracket means (not shown) secured to the support structure 26. The movable plunger 204a of the solenoid-operated drive unit 204 is pivotally connected to the second arm portion of the above described bell-crank level 194 by means of a pivot pin 206 so that the plunger 204a is urged to axially protrude by the bell-crank lever 194 which is urged to turn in the direction of the arrow e in FIG. 4 about the center axis of the shaft 196. The drive unit 204 is adapted to allow the plunger 204a to be held in the retracted axial position by the bell-crank lever 194 when electrically de-energized and to cause the plunger 204a to axially protrude when electrically energized. Such a drive unit 204 is electrically connected to a suitable power source (not shown) across each of the first switch unit 102 (FIGS. 2 and 7) and a fifth switch unit 208 which is provided in conjunction with the previously described selective disc positioning mechanism.

In FIG. 4, the fifth switch unit 208 is shown located in conjunction with the slider plate 162 of the selective disc positioning mechanism. The slider plate 162 has a rear extention 162a projecting rearwardly from the slider plate. The fifth switch unit 208 has an actuating plunger 208a and is supported on suitable bracket means (not shown) secured to, for example, the upper chassis portion 30 of the support structure 26 and has the actuating plunger 208a located to axially project toward the rear extension 162a of the slider plate 162. More specifically, the switch unit 208 is positioned with respect to the upper chassis portion 30 of the support structure 26 so that the actuating plunger 208a thereof is engaged by the rear extension 162a of the slider plate 162 when the slider plate 162 is held in or moved back into the previously mentioned laterally outermost position thereof. The fifth switch unit 208 thus arranged is constructed in such a manner as to close with the actuating plunger 208a axially protruded and to be open with the plunger 208a axially retracted. The actuating plunger 208a of the switch unit 208 is biased to axially protrude laterally inwardly with respect to the upper chassis portion 30 of the support structure 26 by suitable biasing means (not shown) incorporated in the switch unit 208. When, thus, the slider plate 162 is moved laterally inwardly from the laterally outermost position thereof with respect to the upper chassis portion 30 of the support structure 26 against the force of the tension spring 170, the actuating plunger 208a of the switch unit 208 is allowed to axially protrude toward the rear extension 162a of the slider plate 162 and holds the switch unit 208 in the closed condition thereof. When, however, the slider plate 162 is moved back into the laterally outermost position thereof, the rear extension 162a of the slider plate 162 id brought into pressing engagement with the actuating plunger 208a of the switch unit 208 and forces the plunger 208a to axially retract, causing the switch unit 208 to open.

The solenoid-operated drive unit 204 of the previously described reset means is, thus, adapted to be connected to the power source therefor with the first switch unit 102 held in the closed condition thereof and to be disconnected from the power source with the fifth switch unit 208 brought into the open condition thereof.

The automatic disc loading and unloading system embodying the present invention further comprises a cam mechanism for controlling pickup arm drive means for the pickup arm assembly of the playback apparatus.

In FIGS. 2 and 4 of the drawing, the pickup arm assembly is shown comprising a pickup arm 210 which is cantilevered to a fulcrum unit 212 supported on the lower chassis portion 28 of the support structure 26 and having a vertical axis of rotation substantially normal to the lower and upper chassis portions 28 and 30 of the support structure 26. The pickup arm 210 has carried at its leading end a suitable pickup head such as for example a stylus cartridge 214 and at the other end of the arm a counter weight 216 as is customary. The pickup arm 210 thus arranged is pivotally movable about the vertical axis of rotation of the fulcrum unit 212 out of and back into a predetermined rest position with respect to the turntable structure 54 of the disc support assembly 48. The stylus cartridge 214 on the pickup arm 210 is thus movable in an arc about the axis of rotation of the fulcrum unit 212 toward and away from an upward extension of the axis of rotation of the turntable structure 54. The construction and arrangement of the pickup arm assembly per se is not only well known in the art but rather immaterial to the understanding of the system according to the present invention and, for this reason, will not be further described herein.

The above mentioned pickup arm drive means is arranged to be capable of automatically driving the pickup arm 210 of such a pickup arm assembly to turn about the axis of rotation of the fulcrum unit 212 from the above mentioned rest position thereof selectively into any one of the three different angular positions with respect to the turntable structure 54 depending upon the size of the recording disc supplied to the disc support assembly 48 for playback operation. In FIG. 4 of the drawings, such pickup arm drive means is comprising a pickup arm drive motor 216, and a generally circular cam member 218 secured to and coaxially rotatable with the output shaft of the motor 206. The cam member 218 has a generally semicircular large-diameter lobe portion and a generally semicircular small-diameter lobe portion and is drivingly connected to the pickup arm 210 by means of a two-link crank mechanism consisting essentially of a crank lever 220 and a connecting link 222. The connecting link 222 is pivotally movable about the center axis of a pin 224 connected to the pickup arm 210. The crank lever 220 is pivotally connected at one end thereof to the above mentioned cam member 218 by a pivot pin 226 and at the other end thereof to a leading end portion of the connecting link 222. The crank mechanism thus constructed generally is also well known in the art and is adapted to convert the rotation of the output shaft of the motor 216 into rocking motions of the pickup arm 210 about the axis of rotation of the fulcrum unit 212.

The pickup arm drive motor 216 is operated under the control of an arm-drive control switch unit 230 and an emergency stop switch unit 232 (FIG. 2). The arm-drive control switch unit 230 has an actuating plunger 230a which is held in slidable contact at its leading end on the cam member 218 and which is thus adapted to axially protrude or retract depending upon the angular position of the cam member 218 about the axis of rotation of the output shaft of the motor 216. The cam member 218 has one of its large-diameter and small-diameter lobe portions contacted by the actuating plunger 230a of the switch unit 230 when the crank mechanism of the arm drive assembly is in the process of driving the pickup arm 210 for a lead-in motion from the rest position thereof. When, on the hand, the crank mechanism of the arm drive assembly is in the process of driving the pickup arm 210 for a return motion back to the rest position thereof, the cam member 218 has the other of the cam lobe portions held in sliding contact with the actuating plunger 230a of the switch unit 230. The switch unit 230 is thus responsive to the lead-in and return motions of the pickup arm 210. On the other hand, the emergency stop switch unit 232 is attached to, for example, the front wall portion 22 of the casing structure 20 and has an actuating plunger 232a projecting forwardly from the wall portion 22 axially movably through a slot formed in the wall portion 22. When the actuating plunger 232a of the switch unit 232 is manually operated, the switch unit 232 is caused to close and energizes the arm drive motor 216 for driving the pickup arm 210 for return motion to the rest position thereof. Though not shown in the drawings, the arm drive motor 216 is further connected to suitable end-of-disc responsive switch means adapted to energize the motor 216 for driving the pickup arm 210 for return motion to the rest position thereof at the end of a playback operation.

The previously mentioned cam mechanism is adapted to control the pickup arm drive means thus constructed and arranged and comprises a stepped cam member 234 which is positioned below the carrier plate 178 of the previously described switch carrier mechanism and which is securely connected to or integral with the switch carrier plate 178 as shown in FIGS. 4 and 14 of the drawings. The cam member 234 longitudinally extends in a direction generally parallel with the front-and-rear directions d (FIG. 1) of the casing structure 20 and has one side edge formed with three cam surface portions which consist of a first or foremost cam surface portion 234a, a second or intermediate cam surface portion 234b and a third or rearmost cam surface portion 234c. The foremost cam surface portion 234a terminates at the rear end of the cam member 234 and merges forewardly into the intermediate cam surface portion 234b. The intermediate cam surface portion 234b in turn merges forewardly into the rearmost cam surface portion 234c which terminates at the front end of the cam member 234. Each of the cam surface portions 234a, 234b and 234c extends substantially in parallel with the direction in which the switch carrier plate 178 is longitudinally movable with respect to the upper chassis portion 30 of the support structure 26.

The cam mechanism of the system embodying the present invention further comprises a bell-crank lever 236 having an intermediate fulcrum pivotally mounted on a pin 238 which is secured to suitable bracket means (not shown) secured to the support structure 26 and which has a vertical center axis. The bell-crank lever 236 further has a first arm portion carrying an elongated camfollower rod 240 vertically upstanding from the first arm portion of the lever 236 and slidably engageable with the cam member 234 as will be seen from FIGS. 2, 4 and 14. The bell-crank lever 236 is urged by suitable biasing means such as a preloaded helical tension spring 242 to turn about the center axis of the pin 238 clockwise in FIG. 4 as indicated by arrow f so that the cam follower rod 240 upstanding from the first arm portion of the lever 236 is selectively held in engagement with any one of the cam surface portions 234a, 234b and 234c of the cam member 234 depending upon the longitudinal position of the cam member 234 and accordingly the longitudinal direction of the switch carrier plate 178 with respect to the support structure 26. The bell-crank lever 236 further has a second arm portion merging out of the intermediate fulcrum portion of the lever 236 and angularly spaced apart from the first arm portion of the lever 236 about the center axis of the pin 238 as will be best seen from FIG. 4. The second arm portion of the bell-crank lever 236 is formed with three stepped portions 236a, 236b and 236c which are selectively engageable with a suitable arm position control member (not shown) movable with the pickup arm 210.

The cam member 234 of the cam mechanism thus constructed and arranged is operative to have its cam surface portions 234a, 234b and 234c engaged by the cam follower rod 240 on the first arm portion of the bell-crank lever 236 when the switch carrier plate 178 is held in the previously mentioned foremost limit position, intermediate longitudinal position and rearmost limit position, respectively, thereof with respect to the upper chassis portion 30 of the support structure 26. The bell-crank lever 236 is thus permitted to selectively assume any one of three different angular positions about the center axis of the pin 238 with the cam follower rod 240 engaged by any one of the cam surface portions 234a, 234b and 234c of the cam member 234. Such an angular position of the bell-crank lever 236 is predominant over the angular position of the pickup arm 210 to be driven for lead-in motion from the rest position thereof. Thus, the pickup arm 210 can be driven for lead-in motion from the rest position thereof through any one of three predetermined angles which are respectively dictated by the three different angular positions of the bell-crank lever 236 about the center axis of the pin 238 and accordingly by any one of the three different longitudinal positions of the switch carrier plate 178.

Description will be hereinafter made regarding the manners in which the automatic disc loading and unloading apparatus constructed and arranged as hereinbefore described operates.

When the playback apparatus is held inoperative, the tiltable turntable structure 104 is maintained in the raised anggular position thereof by the force of the tension spring 112 because the solenoid operated drive unit 116 is held inoperative with the second switch unit 126 kept open. The front upstanding edge portions 118 and 118' of the platform structure 104 are therefore located in the path along which a recording disc is to be transfered from the disc guide structure 34 to the turntable structure 54. The tiltable platform structure 104 being held in the raised angular position thereof, the rockable levers 84 and 84' of the disc transfer mechanism 76 (FIG. 7) are held in the angular positions having their respective front arm portions raised upwardly by the pins 132 and 132' upstanding from the front wall portion 106 of the platform structure 104. The rear arm portion of the rockable lever 84' is therefore held in the angular position downwardly spaced apart from the normally-closed first switch unit 102, which is therefore held in the closed condition thereof. In the absence of a recording disc in pressing contact with the detector element 122 on the front wall portion 106 of the tiltable platform structure 104, the second switch unit 126 of the normally-open type is kept open so that each of the motor 70 of the drive means for the turntable structure 54 and the solenoid-operated drive unit 116 connected to the platform structure 104 is maintained inoperative. With the tiltable platform structure 104 held in the raised angular position thereof, furthermore, the third switch unit 128 is kept open and the motor 96 of the drive means for the disc transfer mechanism 76 is maintained inoperative so that the drive rollers 80a, 80b and 80c of the transfer mechanism 76 stay at rest. In the absence of a recording disc in pressing contact with the actuating plunger 192a of the fourth switch unit 192 on the switch carrier plate 178, the fourth switch unit 192 of the normally-closed type is maintained in the closed condition. On the other hand, the normally-closed fifth switch unit 208 provided in conjunction with the selective disc positioning mechanism is maintained open by the rear extension 162a of the slider plate 162 which is held in the laterally outermost position thereof by the force of the tension spring 170 of the disc positioning mechanism. The fifth switch unit 208 being thus kept open, the solenoid-operated drive unit 204 forming part of the reset means remains inoperative so that the carrier plate 178 of the switch carrier mechanism is maintained in the foremost limit position thereof with respect to the upper chassis portion 30 of the support structure 26. Furthermore, the motor 216 forming part of the pickup arm drive means is maintained inoperative so that the pickup arm 210 of the playback apparatus is maintained in the rest position illustrated in FIG. 2 and schematically in FIG. 4 of the drawings.

When, now, it is desired to playback a recording disc D of any size, the disc D is manually inserted into the casing structure 20 of the apparatus through the disc inlet and outlet slot 42 at the front of the casing structure 20 as shown in FIG. 1. The recording disc D thus inserted into the disc inlet and outlet slot 42 in the disc guide structure 34 is passed between the respective inner panel portions 38a and 40a of the lower and upper guide members 38 and 40 of the guide structure 34 and is thus guided to advance substantially horizontally on the flat upper face of the inner panel portion 38a of the lower guide member 38 toward the front end of the tiltable platform structure 104 which is held in the raised angular position thereof about the center axis of the cross shaft 110 by the force of the tension spring 112 (FIGS. 2 and 3). With the rockable levers 84 and 84' of the disc transfer mechanism 76 held in the angular positions having the their respective front arm portions raised as shown in FIG. 2, the guide rollers 94a and 94b on the guide roller shaft 82 carried by the first arm portions of the levers 84 and 84' are positioned above the drive shaft 78 carrying the drive rollers 80a, 80b and 80c. The recording disc D advancing past the leading end of the inner panel portion 38a of the lower guide member 38 is permitted to directly reach the front end of the tiltable platform structure 104. If, in this instance, the recording disc D is being moved in an incorrect direction toward the axis of rotation of the turntable structure 54, then the recording disc D is brought into abutting contact at the leading end of its outer circumferential edge with one of the upstanding edge portions such as the upstanding edge portion 118' of the front wall portion 106 of the platform structure 104 as indicated by Da in FIG. 10. The recording disc D is therefore prevented from further advancing beyond the upstanding edge portions 118 and 118' of the platform structure 104 so that the second switch unit 126 remains in the open condition thereof. If the direction of advance of the recording disc D thus inserted into the casing structure 20 is manually corrected so that the recording disc D is caused to advance in a correct direction having its center axis located on the vertical plane L (FIG. 4), the recording disc D is permitted to advance straight toward the free end portion of the detector element 122 on the front wall portion 106 of the platform structure 104 and is brought into pressing contact with the free end portion of the detector element 122 at the leading end of its outer circumferential edge, as indicated by Db in FIG. 10.

The detector element 122 on the platform structure 104 is now pressed rearwardly by the recording disc D and forces the actuating plunger 126a of the second switch unit 126 to retract rearwardly, thereby causing the switch unit 126 to close. The second switch unit 126 being thus caused to close, the motor 70 of the drive means for the turntable structure 54 is actuated to start operation and, at the same time, the solenoid-operated drive unit 116 having the plunger 126a connected to the platform structure 104 is energized from the power source therefor through the switch unit 126. The motor 70 being put into operation, the flywheel 52 and accordingly the turntable structure 54 are driven for rotation about the center axis of the center shaft 50 by means of the endless drive belt 74 passed between the flywheel 52 and the wharve 72 on the output shaft of the motor 70. On the other hand, the solenoid-operated drive unit 116 energized from the power source therefor is actuated to cause its plunger 116a to retract rearwardly and drives the tiltable platform structure 104 to incline downwardly from the raised angular position thereof about the center axis of the cross shaft 110 against the force of the tension spring 112. It therefore follows that the front upstanding edge portions 118 and 118' as well as the second switch unit 126 on the front wall portion 106 of the tiltable platform structure 104 are downwardly withdrawn from the path of advancement of the recording disc D toward the axis of rotation of the turntable structure 54.

The tiltable platform structure 104 being driven to tilt downwardly with respect to the lower and upper chassis portions 28 and 30 of the support structure 26, the pins 132 and 132' upstanding from the lateral lug portions 130 and 130', respectively, of the platform structure 104 are also moved downwardly with respect to the chassis portions 28 and 30 of the support structure 26. The rockable levers 84 and 84' which have been held in the angular positions having their respective front arm portions raised by the pins 132 and 132', respectively, are permitted to turn in the directions of the arrows a and a' about the aligned center axes of the pins 88 and 88', respectively, until the guide rollers 94a and 94b on the guide roller shaft 82 supported by the first arm portions of the levers 84 and 84' are downwardly brought into contact with the upper face of the recording disc D which has its leading end portion moved past the drive rollers 80a, 80b, and 80c on the drive shaft 78. After the guide rollers 94a and 94b are thus permitted to rest on the recording disc D, the pins 132 and 132' on the platform structure 104 being angularly moved downwardly are disengaged from the front lateral lug portions 90 and 90' of the rockable levers 84 and 84', respectively. The tiltable platform structure 104 is thus brought into pressing contact with the actuating plunger 128a of the third switch unit 128 and is brought into the lower limit angular position thereof about the center axis of the cross shaft 110, as shown in FIG. 2.

The guide rollers 94a and 94b rotatable on the guide roller shaft 82 having been brought into contact with the upper face of the recording disc D as above described, the recording disc D is interposed between the set of drive rollers 80a, 80b and 80c on the drive shaft 78 and the set of guide rollers 94a and 94b on the guide roller shaft 82 and is pressed downwardly onto the drive rollers 80a, 80b and 80c by the weights of the guide roller shaft 82, the guide rollers 94a and 94b and the front arm portions of the rockable levers 84 and 84'.

The third switch unit 128 being closed as above described, the motor 96 of the drive means for the disc transfer mechanism 76 is electrically connected through the switch unit 128 to the power source therefor and is actuated to start operation. The driving power thus delivered from the motor 96 is transmitted through the drive gear 98 and driven gear 100 of the drive means to the drive shaft 78 and accordingly to the drive rollers 80a, 80b and 80c, which are therefore driven to turn about the center axis of the drive shaft 78 in the direction to move the overlying recording disc D. The movement of the recording disc D in turn causes the overlying guide rollers 94a and 94b to rotate about the center axis of the guide roller shaft 82 in a direction opposite to the direction of rotation of the drive rollers 80a, 80b and 80c, as indicated in FIG. 8.

The recording disc D which has been moved into the casing structure 20 by manual effort is now positively driven to advance toward the turntable structure 54 by the drive rollers 80a, 80b and 80c and the guide rollers 90a and 90b of the disc transfer mechanism 76. The recording disc D being thus moved past the transfer mechanism 76 advances over the U-shaped recess 30a in the upper chassis portion 30 of the support structure 26 and below the disc clamping member 62 suspended from the bracket member 66 secured to the cross member 46. Under these conditions, the turntable structure 54 is maintained in its lowered axial position with respect to the upper chassis portion 30 of the support structure 26 against the force of the compression spring 60 with the tiltable platform structure 104 held in the lower limit angular position thereof and accordingly with the pins 134 (FIGS. 5 and 6) on the front wall portion 106 of the platform structure 104 held in downwardly pressing engagement with the upper face of the flange portion 54b of the turntable structure 54, as shown in FIG. 3.

The recording disc D initially inserted into the disc inlet and outlet slot 42 between the respective outer edge portions 38b and 40b of the lower and upper guide members 38 and 40 of the disc guide structure 34 advances between the wing members 136 and 136' pivotally movable about the center axes of the pins 138 and 138', respectively, forming part of the disc-size discriminating mechanism positioned on both sides of the disc guide structure 34 (FIG. 4). When each of the slider plates 162 of the selective disc positioning mechanism is held in the laterally outermost position with respect to the upper chassis portion 30 of the support structure 26, the wing members 136 and 136' assume such angular positions about the center axes of the pins 138 and 138', respectively, that the wing members 136 and 136' are laterally spaced apart at their respective leading ends a distance which is substantially equal to the standardized diameter of a small-sized or 7-inch diameter recording disc.

If, therefore, the recording disc D being moved through the disc guide structure 34 is of such a size, the recording disc D is permitted to advance between the respective leading ends of the wing members 136 and 136' without forcing the wing members to turn laterally outwardly about the center axes of the pins 138 and 138', respectively. The wing members 136 and 136' are therefore maintained in situ with respect to the support structure 26 and are unable to drive the respectively associated rockable members 144 and 144' to turn about the center axes of the pins 146 and 146', respectively. For this reason, the wing members 136 and 136' can not serve as guide means for guiding the recording disc D correctly with respect to the vertical plane L (FIG. 4) if the recording disc D is of the standardized small-size or 7-inch diameter type. For the purpose of avoiding such an inconvenience encountered when a small-sized or 7-inch diameter recording disc is to be loaded into the palyback apparatus, a suitable indicium indicating the vertical plane L (FIG. 4) or the measurement of such a recording disc may be marked on the front face of the outer edge portion 38b of the lower guide member 38 or the outer edge portion 40b of the upper guide member 40. In FIG. 1 of the drawings, such an indicium is shown provided as a line 244 indicated on the front face of the outer edge portion 40b of the upper guide member 40.

The rockable levers 144 and 144' of the disc-size discriminating mechanism being held in situ as above described, each of the slider members 162 of the selective disc positioning mechanism is maintained in the laterally outermost position thereof with respect to the upper chassis portion 30 of the support structure 26. Each of the pins 152 and 152' such as the pin 152 on the front pivotal shaft 148 of the disc positioning mechanism is received in the laterally inner small-area portion of the front slot 164 in the slider plate 162 and, likewise, each of the pins 154 and 154' such as the pin 154 on the rear pivotal shaft 150 of the disc positioning mechanism is received in the laterally inner small-area portion of the rear slot 166 in the slider plate 162 as shown in FIG. 4. It therefore follows that the pins 152 and 152' on the front pivotal shaft 148 are held in their respective upright angular positions projecting upwardly through the slots 156 in the upper chassis portion 30 of the support structure 26 from the pivotal shaft 148 and, similarly, the pins 152 and 152' on the rear pivotal shaft 150 are held in their respective upright angular positions axially projecting upwardly through the slots 158 in the upper chassis portion 30 of the support structure 26 from the pivotal shaft 150.

The recording disc D of the standardized small-sized or 7-inch diameter type driven by the drive rollers 80a, 80b and 80c to advance with respect to and immediately above the upper chassis portion 30 of the support structure 26 is therefore finally brought into abutting contact at its outer circumferential edge with the pins 152 and 152' on the front pivotal shaft 148 and is thus forced to stop its advancing movement with respect to the upper chassis portion 30 of the support structure 26 although the drive rollers 80a, 80b and 80c are still being driven to rotate about the center axis of the drive shaft 78 and held in rolling contact with the lower face of the recording disc D.

If, on the other hand, the recording disc D to be loaded into the playback apparatus for reproducing purposes is of the standardized medium-sized or 10-inch type, the recording disc D being passed through the disc guide structure 34 is brought into sliding and pressing contact at its outer circumferential edge with the respective inner faces of the wing members 136 and 136' of the disc-size discriminating mechanism. The wing members 136 and 136' are therefore forced to laterally turn about the center axes of the pins 138 and 138', respectively, with the assistance of the tension springs 142 and 142' so as to permit passage of the recording disc between the wing members 136 and 136'. Such turning motions of the wing members 136 and 136' are transmitted to the rockable levers 144 and 144', respectively, which are accordingly forced to turn about the center axes of the pins 146 counter-clockwise in FIG. 4 as indicated by the arrows c and c', respectively, therein. It therefore follows that rear arm portion of each of the rockable levers 144 and 144' such as the rockable lever 144 as shown is brought into pressing engagement with the slider actuating element or pin 174 projecting downwardly from the slider plate 162 of the selective disc positioning mechanism. This causes the slider plate 162 to move laterally inwardly below and with respect to the front and rear pivotal shafts 148 and 150 and the upper chassis portion 30 of support structure 26 against the force of the tension spring 170. At the point of time when the recording disc D of the medium-sized or 10-inch diameter type being passed between the wing members 136 and 136' reaches with respect to the wing members a position having its outer circumferential edge brought into contact at diametertically opposite end of the edge with the respective leading ends of the wing members 136 and 136', the slider plate 162 reaches with respect to the upper chassis portion 30 of the support structure a lateral position having the front slot 164 located to accommodate in the laterally outer large-area portion of the slot 164 the pin 152 projecting upwardly from the front pivotal shaft 148. When the slider plate 162 is moved into such a lateral position, the pin 154 on the rear pivotal shaft 150 is still located in the laterally inner small-area portion of the rear slot 166 in the slider plate 162 as will be seen from FIG. 11 since the laterally inner small-area portion of the rear slot 166 is wider in lateral extent than the laterally inner small-area portion of the front slot 164 in the slider plate 162 as previously described.

The pin 152 on the front pivotal shaft 148 being now located within the laterally outer large-area portion of the front slot 164 in the slider plate 162, the pin 152 and accordingly the pin 152' on the shaft 148 are permitted to turn through the slot 164 and thus permits the front pivotal shaft 148 to turn in the direction to cause the pins 152 and 152' to tilt rearwardly and downwardly about the axis of rotation of the shaft 148 as shown in FIG. 12 by the force of the biasing means (not shown) connected to the shaft 148. The front pivotal shaft 148 being thus turned about the center axis thereof with respect to the upper chassis portion 30 of the support structure 26 and accordingly to the carrier plate 178 of the switch carrier mechanism, the first carrier retaining member 188 on the shaft 148 is caused to turn about the center axis of the shaft 148 in the direction to have its front arm portion inclined forwardly and its rear arm portion inclined downwardly as indicated by the phantom lines in FIG. 14. The result is that the hook portion 188a of the first carrier retaining member 188 is disengaged from the first lug portion 184 of the switch carrier plate 178 and permits the switch carrier plate 178 to move rearwardly from the foremost limit position thereof with respect to the upper chassis portion 30 of the support structure 26 and accordingly to the front and rear pivotal shafts 148 and 150 by the force of the tension spring 200 forming part of the reset means shown in FIG. 4. The switch carrier plate 178 is thus permitted to move rearwardly until the carrier plate 178 reaches the previously mentioned intermediate longitudinal position thereof with respect to the upper chassis portion 30 of the support structure 26 with the second lug portion 186 brought into abutting engagement at its rear end with the hook portion 190a of the second carrier retaining member 190 on the rear pivotal shaft 150 having the pins 154 and 154' still held in the upright angular positions on the shaft 150.

The recording disc D of the standardized medium-sized or 10-inch diameter type driven by the drive rollers 80a, 80b and 80c to advance with respect to and immediately above the upper chassis portion 30 of the support structure 26 is thus finally brought into abutting contact at its outer circumferential edge with the pins 154 and 154' on the rear pivotal shaft 150 and is forced to stop its advancing movement with respect to the turntable structure 54 although the drive rollers 80a, 80b and 80c of the disc transfer mechanism 76 are still being driven for rotation about the center axis of the drive shaft 78 by means of the drive motor 96.

If, furthermore, the recording disc to be loaded into the playback apparatus is of the standardized large-sized or 10-inch diameter type, the wing plates 136 and 136' of the disc-size discriminating mechanism are forced to turn about the center axes of the pins 138 and 138', respectively, until the respective leading ends of the wing members 136 and 136' are spaced apart from each other a distance substantially equal to the diameter of the recording disc. Such an angular motion of each of the wing members 136 and 136' is transmitted through the associated one of the rockable levers 144 and 144' to the slider plate 162 of the selective disc positioning mechanism and causes the slider plate 162 to move from the laterally outermost limit position thereof to a lateral position in which not only the front slot 164 in the slider plate 162 is located to accommodate in its laterally outer large-area portion the pin 152 projecting upwardly from the first pivotal shaft 148 but also the rear slot 164 in the plate 162 is located to accommodate in its laterally outer large-area portion the pin 154 projecting upwardly from the rear pivotal shaft 150. Thus, the slider plate 162 is laterally movable with respect to the upper chassis portion 30 of the support structure 26 into any of the laterally outermost limit position corresponding to the diameter of a small-sized or 7-inch diameter recording disc, the intermediate lateral position corresponding the diameter of a medium-sized or 10-inch diameter recording disc, and the laterally innermost limit position corresponding to the diameter of a large-sized or 12-inch diameter recording disc.

The pin 152 on the front pivotal shaft 148 being located within the laterally outer large-area portion of the front slot 164 in the slider plate 162, the pin 152 is permitted to turn through the slot 164 and thus permits the front pivotal shaft 148 to turn about the center axis thereof in the direction to cause the pin 152 and also the pin 152' on the shaft 148 to tilt rearwardly and downwardly about the axis of rotation of the shaft 148. At the same time, the pin 154 on the rear pivotal shaft 150 is located within the laterally outer large-area portion of the rear slot 166 in the slider plate 162 and is permitted to turn through the rear slot 166, thereby permitting the rear pivotal shaft 150 to turn about the center axis thereof in the direction to cause the pin 154 and also the pin 154' on the shaft 150 to tilt rearwardly and downwardly about the axis of rotation of the shaft 150. Both of the front and rear pivotal shafts 148 and 150 being thus turned about the respective center axes thereof with respect to the upper chassis portion 30 of the support structure 26 and accordingly to the carrier plate 178 of the switch carrier mechanism, each of the first and second carrier retaining members 188 and 190 on the front and rear shafts 148 and 150 is caused to turn about the center axis of each of the shafts in the direction to have its front arm portion inclined forwardly and its rear arm portion inclined downwardly about the center axis of each shaft, as indicated by the phantom lines in FIG. 14. The result is that the hook portion 188a of the first carrier retaining member 188 is disengaged from the first lug portion 184 of the switch carrier plate 178 and permits the switch carrier plate 178 to move rearwardly from the foremost limit position thereof with respect to the upper chassis portion 30 of the support structure 26 and accordingly to the front and rear pivotal shafts 148 and 150 by the force of the tension spring 200 of the reset means illustrated in FIG. 4. The rear arm portion of the second carrier retaining member 190 being inclined downwardly below and with respect to the switch carrier plate 178, the second lug portion 186 of the switch carrier plate 178 clears over the hook portion 190a of the second carrier retaining member 190 when the carrier plate 178 is being moved rearwardly with respect to the upper chassis portion 30 of the support structure 26. The switch carrier plate 178 is in this fashion moved directly from the foremost limit position to the rearmost limit position thereof with respect to the upper chassis portion 30 of the support structure 26.

The recording disc D of the standardized large-sized or 12-inch diameter type driven by the drive rollers 80a, 80b and 80c to advance with respect to and immediately above the upper chassis portion 30 of the support structure 26 is thus finally brought into abutting contact at its outer circumferential edge with the pins 160 and 160' projecting upwardly from the upper face of the upper chassis portion 30 of the support structure 26 and is forced to stop its advancing movement with respect to the turntable structure 54.

The recording disc D driven to advance by means of the disc transfer mechanism 76 is in this manner brought into abutting engagement at its outer circumferential edge selectively with the pins 152 and 152' on the front pivotal shaft 148, the pins 154 and 154' on the rear pivotal shaft 150 or the pins 160 and 160' on the upper chassis portion 30 of the support structure 26 depending upon the size of the recording disc D. Actually or more exactly, the recording disc D finally brought into abutting engagement with one of these three pairs of pins is first brought into contact with one of the two paired pins and thereafter with the other of the pins because the recording disc D advancing toward the two pins is seldom enabled to be correctly centered on the vertical plane L (FIG. 4). Such an incorrect direction of advancement of the recording disc D being moved closer to the target pins 152 and 152', 154 and 154', or 160 and 160' is automatically adjusted and remedied by the differential rotation of the guide rollers 94a and 94b of the disc transfer mechanism 76. The guide rollers 94a and 94b are mounted on the guide roller shaft 82 in such a manner as to be rotatable independently of each other as previously noted and are, for this reason, enabled to rotate at different circumferential speeds about the center axis of the guide roller shaft 82 when the recording disc D being driven to travel by the drive rollers 80a, 80b and 80c. If, therefore, the recording disc D is brought into abutting engagement at a leading end portion of its outer circumferential edge with only one of the target pins 152 and 152', 154 and 154' or 160 and 160', one of the guide rollers 94a and 94b is enabled to turn on the upper face of the disc D with a circumferential speed higher or lower than the circumferential speed of rotation of the other of the rollers 94a and 94b and thus causes the recording disc D to skew with respect to the vertical plane L (FIG. 4) until the disc D is brought into abutting engagement with the remaining one of the target pins. Such a function of the guide rollers 94a and 94b is enhanced because of the fact that the material forming the frictional outer peripheral surface of each of the guide rollers 94a and 94b is smaller in coefficient of friction than the material forming the frictional outer peripheral surface of each of the drive rollers 80a, 80b and 80c as previously described.

The recording disc D of any standardized size is thus brought into abutting contact with one of the three pairs of pins and is located correctly in coaxial relationship to the turntable structure 54 which is still held in the lowered axial position below the upper chassis portion 30 of the support structure 26. When the recording disc D is moved into the position axially aligned with the turntable structure 54 below the chassis portion 30, the recording disc D is brought into pressing contact at the leading end of its outer circumferential edge with the actuating plunger 192a of the fourth switch unit 192 on the switch carrier plate 178 which is held in the foremost limit position thereof or moved into the intermediate longitudinal position or the rearmost limit position thereof depending upon the size of the recording disc D.

The actuating plunger 192a of the fourth switch unit 192 being thus depressed and caused to retract rearwardly with respect to the switch carrier plate 178, the switch unit 192 of the normally-closed type is rendered open with the result that each of the motor 96 of the drive means for the disc transfer mechanism 76 and the solenoid-operated drive unit 116 connected to the tiltable platform structure 104 is electrically disconnected from the power source therefor.

The motor 96 for the disc transfer mechanism 76 being thus energized, the drive shaft 78 is caused to stop rotation so that the individual drive rollers 90a, 80b and 80c on the drive shaft 78 cease sliding motions on the lower face of the recording disc D which is correctly centered with respect to the turntable structure 54 positioned below the recording disc through the U-shaped recess 30a in the upper chassis portion 30 of the support structure 26.

Figure 15:
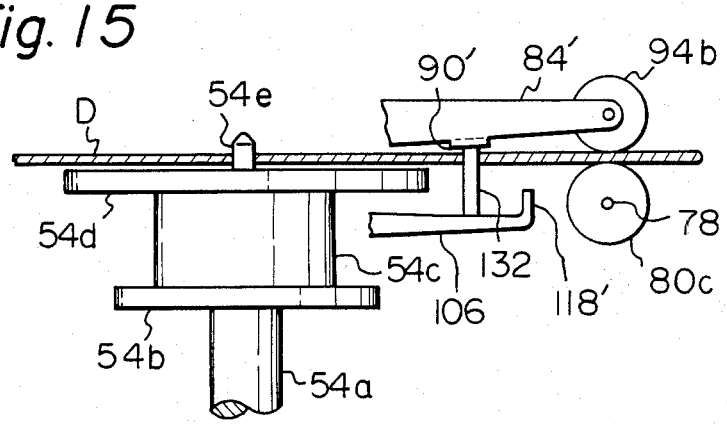
FIG. 15 is a fragmentary side elevation view showing, partially in section, an arrangement including part of a disc support assembly and part of a disc transfer mechanism of a system embodying the present invention.

The solenoid-operated drive unit 116 being de-energized, on the other hand, the tiltable platform structure 104 is allowed to turn upwardly from the lower limit angular position thereof about the center axis of the cross shaft 110 by the force of the tension spring 112. The upward angular movement of the tiltable platform structure 104 is followed by axially upward movement of the turntable structure 54 which is urged to move upwardly above the lower chassis portion 28 of the support structure 26 by the force of the preloaded helical compression spring 60. As the turntable structure 54 is thus moved upwardly above the lower chassis portion 28 of the support structure 26, either the spindle portion 54a of the turntable structure 54 is upwardly passed through the center hole in the recording disc D as shown in FIG. 15 (if the recording disc D is of the non-donut-shaped type) or the EP adapter 56 which has been projecting upwardly from the annular concavity between the central sleeve portion 54a and the coaxial drum portion 54c of the turntable structure 54 by the force of the compression spring 58 is received into the center hole of the recording disc D (if the recording disc D is of the donut-shaped type).

For a certain period of time after the tiltable platform structure 104 is initiated into motion to angularly move upwardly from the lower limit angular position thereof, the pins 134 on the front wall portion 106 of the platform structure 104 are held in engagement with the upper face of the flange portion 54b of the turntable structure 54 which is being axially moved upwardly above the lower chassis portion 28 of the support structure 26 by the force of the preloaded tension spring 60. The turntable structure 54 is therefore permitted to move upwardly together with the tiltable platform structure 104 with respect to the overlying recording disc D until the pins 134 and 134' on the platform structure 104 are disengaged from the flange portion 54b of the turntable structure 54. At the point of time when the spindle portion 54e of the turntable structure 54 or the EP adapter 56 on the turntable structure 54 is passed through the center hole in the recording disc D, the pins 132 and 132' on the lug portions 130 and 130' of the platform structure 104 are located slightly below the front lug portions 90 and 90' of the rockable levers 84 and 84', respectively. Thus, the timing at which the pins 132 and 132' on the platform structure 104 are initially brought into upwardly pressing engagement at their respective upper ends with the lug portions 90 and 90' of the rockable levers 84 and 84', respectively, is selected to be slightly later than the timing at which the spindle portion 54e of the turntable structure 54 or the EP adapter 56 on the turntable structure 54 is received into the center hole in the recording disc D to be carried by the turntable structure 54. Such timings in turn can be selceted by appropriately selecting the geometry of some related elements such as, for example, the height of the spindle portion 54e from the upper face of the table portion 54d of the turntable structure 54, the axial length of the EP adapter 56, the axial length of the helical compression spring 58 in an unloaded condition, the heights of the pins 132 and 132' from the upper faces of the lateral lug portions 130 and 130', respectively, of the tiltable platform structure 104, the locations of the front lug portions 90 and 90' of the rockable levers 84 and 84', respectively, and so forth. Through such selection of the geometry of any of these members and portions, the guide rollers 94a and 94b carried by the rockable levers 84 and 84' are permitted to be upwardly disengaged from the recording disc D after the spindle portion 54e of the turntable structure 54 or the EP adapter 56 on the turntable structure 54 has been received into the center hole in the recording disc D. In other words, the recording disc D which has been correctly centered with respect to the turntable structure 54 is seized with certainty between the set of drive rollers 80a, 80b and 80c and the set of guide rollers 94a and 94b and is in this manner maintained in the correct coaxial position with respect to the underlying turntable structure 54 until the spindle portion 54e of the turntable structure 54 or the EP adapter 56 on the turntable structure 54 is fitted into the center hole in the recording disc D.

After the pins 132 and 132' on the tiltable platform structure 104 being angularly moved upwardly about the center axis of the cross shaft 110 are brought into upwardly pressing engagement with the rockable levers 84 and 84', respectively, the rockable levers 84 and 84' are caused to turn about the aligned center axis of the pins 88 and 88', respectively, in the directions opposite to the directions of the arrows a and a' in FIG. 7 until the platform structure 104 reaches the raised angular position thereof with respect to the upper chassis portion 30 of the support structure 26 as shown in FIG. 2. When the tiltable platform structure 104 is moved into the raised angular position thereof about the center axis of the cross shaft 110, each of the rockable levers 84 and 84' is held, about the center axis of each of the pins 88 and 88', in the angular position having its front arm portion inclined upwardly so that the guide rollers 94a and 94b on the guide roller shaft 82 carried by the levers 84 and 84' are positioned high above the recording disc D which has been received on the table portion 54d of the turntable structure 54 by the time when the turntable structure 104 is moved into the raised angular position thereof.

As the rockable levers 84 and 84' are being driven to turn about the aligned center axis of the pins 88 and 88' by the pins 132 and 132' on the tiltable platform structure 104 as described above, the turntable structure 54 is axially moved upwardly together with the tiltable platform structure 104 by the force of the preloaded compression spring 60. The table portion 54d of the turntable structure 54 is therefore moved upwardly through the U-shaped recess 30a in the upper chassis portion 30 of the support structure 26 and is brought into surface-to-surface contact with the lower face of the recording disc D which has already been captured by the spindle portion 54e of the turntable structure 54 or the EP adapter 56 on the turntable structure 54. In this instance, it is important that the radius of rotation of each of the pins 132 and 132' about the center axis of the cross shaft 110 and the distance between the center axis of the cross shaft 110 and the point at which the tiltable platform structure 104 is held in upwardly pressing engagement through the pins 134 be selected in such a manner that the respective guide rollers 94a and 94b on the rockable levers 84 and 84' are moved upwardly above the recording disc D at a velocity higher than the velocity at which the turntable structure 54 is permitted to move upwardly with respect to the upper chassis portion 30 of the support structure 26. This is useful for preventing the recording disc D from being brought into contact or held in contact with the guide rollers 94a and 94b when the recording disc D is being moved upwardly on the table portion 54d of the turntable structure 54 which is being driven for rotation about the center axis of the shaft 50 with the drive motor 70 already rendered operative.

Immediately before the tiltable turntable structure 104 reaches the raised angular position thereof about the center axis of the cross shaft 110, the projections 134 on the front wall portion 106 of the platform structure 104 are disengaged from the flange portion 54b of the turntable structure 54 whereupon the turntable structure 54 is axially moved independently of the platform structure 104 through the opening 106a formed in the front wall portion 106 of the platform structure 106. The table portion 54d of the turntable structure 54 is thus moved upwardly from and with respect to the upper face of the front wall portion 106 of the platform structure 104 so that the spindle portion 54e of the turntable structure 54 axially projects upwardly into the downwardly open blind axial bore in the disc clamping member 62 which has been suspended from the bracket member 66 attached to the lower face of the cross member 46 (FIGS. 4 to 6). When the disc clamping member 62 is held in the position suspended from the bracket member 66, the upper pivot portion 62d of the clamping member 62 is received on the upper face of the bracket member 66 with the downwardly tapered frusto-conical portion 62b of the clamping member 62 passed downwardly through the opening 66a in the bracket member 66 as will be seen from FIG. 3.

Immediately after the spindle portion 54e of the turntable structure 54 is inserted into the blind axial bore in the disc clamping member 62 which has been held in such a suspended position, the recording disc D placed on the upper face of the table portion 54d of the turntable structure 54 being still moved upwardly and driven for rotation about the center axis of the center shaft 50 is brought into upwardly pressing surface-to-surface contact with the lower face of the disc clamping portion 62c of the clamping member 62 and raises the clamping member 62 until the rigid ball 64 received in the conical concavity in the upper pivot portion 62d of the clamping member 62 is brought into contact with the lower face of the cross member 46 as shown in FIGS. 5 and 6.

When the disc clamping member 62 is being moved upwardly toward the lower face of the cross member 46 with the table portion 54d of the turntable structure 54 held in upwardly pressing engagement with the clamping member 62 through the center hole in the recording disc D, the upper pivot portion 62d of the clamping member 62 is moved upwardly from the upper face of the bracket member 66 so that the downwardly tapered frusto-conical guide portion 62b and thereafter the cylindrical sleeve portion 62a of the clamping member 62 are passed upwardly through the circular opening 66a in the bracket member 66. Since, in this instance, the circular opening 66a in the bracket member 66 has a diameter which is substantially equal to the diameter of the enlarged upper end of the frusto-conical guide portion 62b of the clamping member 62, there is an annular clearance formed around the guide portion 62b and thereafter the cylindrical sleeve portion 62a of the clamping member 62. The disc clamping member 62 is therefore allowed to slightly move laterally with respect to the bracket member 66 fixedly attached to the lower face of the cross member 46 and is, for this reason, enabled to be correctly aligned axially with the turntable structure 54 and the EP adapter on the turntable structure 54 being moved upwardly with respect to the upper chassis portion 30 of the support structure 26 and being driven for rotation about the center axis of the center shaft 50 by means of the motor 70. When the clamping member 62 is ultimately brought into engagement with the lower face of the cross member 46 through the rigid ball 64, the frusto-conical guide portion 62b of the clamping member 62 is positioned above the opening 66a in the bracket member 66 with the cylindrical sleeve portion 62a of the clamping member 62 received loosely in the opening 66a in the bracket member 66 as shown in each of FIGS. 5 and 6.

The recording disc D carried on the table portion 54d of the turntable structure 54 thus brought into engagement with the disc clamping member 62 is elastically pressed between the upper face of the table portion 54a and the lower face of the disc clamping portion 62c of the clamping member 62 by the force of the compression spring 60. If, in this instance, the recording disc D is of the donut-shaped type, the EP adapter 56 on the turntable structure 54 partially projects upwardly into the downwardly open circular concavity in the disc clamping portion 62c of the clamping member 62 by the force of the compression spring 58 as shown in FIG. 5 so that the clamping member 62 is permitted to assume a correct coaxial position with respect to the turntable structure 54 not only by means of the spindle portion 54e of the turntable structure 54 but also by the EP adapter 56. If, on the other hand, the recording disc D clamped between the turntable structure 54 and the disc clamping member 62 is of the non-donut-shaped type, the EP adapter 56 is downwardly withdrawn in its entirety into the concavity in the turntable structure 54 against the force of the compression spring 58 and has its annular upper face held in pressing contact with the labelled central portion of the lower face of the recording disc D as shown in FIG. 6.

After the turntable structure 54 is brought into upwardly pressing engagement with the disc clamping member 62 through the recording disc D, the rotation of the turntable structure 54 being driven for rotation about the center axis of the shaft 50 by the motor 70 through the endless belt 74 and the flywheel 52 is transmitted through the recording disc D to the clamping member 62, which is therefore also driven for rotation about the axis of rotation of the turntable structure 54. When the disc clamping member 62 is brought into engagement with the lower face of the cross member 46 through the rigid ball 64, the clamping member 62 is disengaged from the stationary bracket member 66 with an annular clearance formed between the cylindrical sleeve portion 62a of the clamping member 62 and the circular edge of the bracket member 66 formed with the opening 66a. The clamping member 62 is therefore enabled to rotate about the axis of rotation of the turntable structure 54 independently of and without being interfered with by the stationary bracket member 66 fixedly attached to the cross member 46.

On the other hand, the carrier plate 178 of the switch carrier mechanism is already held in one of the foremost limit position, intermediate longitudinal position and rearmost limit position thereof with respect to the upper chassis portion 30 of the support structure 26 depending upon the size of the recording disc D, as previously described in detail. The cam member 234 longitudinally movable with the switch carrier plate 178 is therefore also held in the longitudinal position having one of its foremost, intermediate and rearmost cam surface portions 234a, 234b and 234c engaged by the cam follower rod 240 upstanding from the first arm portion of the bell-crank lever 236 of the cam mechanism for the previously described pickup arm drive means for the pickup arm 210 (FIGS. 2 and 4). It therefore follows that the bell-crank lever 236 of the cam mechanism is held about the center axis of the pin 238 in the angular position having one of its stepped portions 236a, 236b and 236c held in engagement with the arm position control member (not shown) forming part of the pickup arm drive means.

When the recording disc D is clamped completely between the turntable structure 54 and the disc clamping member 62 and is ready for being reproduced with the turntable structure 54 and clamping member 62 being driven to rotate about the axis of rotation of the turntable structure 54, the arm-drive control switch unit 230 is actuated to close and causes the pickup arm drive motor 216 to start operation. The rotation of the output shaft of the motor 216 is converted into a pivotal motion of the pickup arm 210 through the crank mechanism including the crank lever 220 and the connecting link 222 (FIG. 4) so that the pickup arm 210 is driven for lead-in motion turning about the vertical axis of rotation of the fulcrum unit 212 (FIG. 2) from the rest position thereof into a certain angular position with respect to and over the recording disc D clamped between and rotating with the turntable structure 54 and the disc clamping member 62. The angular position to which the pickup arm 210 is to be turned from the rest position thereof about the vertical axis of rotation of the fulcrum unit 212 is automatically dictated by the angular position of the bell-crank lever 236 having one of its stepped portions 236a, 236b and 236c engaged by the pickup position control member of the pickup arm drive means as above noted. The pickup arm 210 is in this fashion turned about the vertical axis of rotation of the fulcrum unit 212 from the rest position thereof to the angular position predetermined depending upon the size of the recording disc D to be played back.

A playback operation with the recording disc D is now commenced with the pickup head such as the stylus cartridge 214 (FIG. 2) resting on the upper face of the rotating recording disc D. Throughout the playback operation, the tiltable platform structure 104 is maintained in the raised angular position thereof about the center axis of the cross shaft 110 so that the guide rollers 94a and 94b on the guide roller shaft 82 carried on the rockable levers 84 and 84' of the disc transfer mechanism 76 are held in the position raised high above the rotating recording disc D, indicated by the full lines in FIG. 2. With the tiltable platform structure 104 thus maintained in the raised angular position thereof with respect to the upper chassis portion 30 of the support structure 26, the upstanding edge portions 118 and 118' of the front wall portion 106 of the platform structure 104 are located in the path of advance of a recording disc ahead of the disc guide structure 34. If, therefore, another recording disc is accidentally or inadvertently inserted into the playback apparatus through the disc inlet and outlet slot 42 at the front of the casing structure 20 during playback operation of the recording disc D, the second recording disc is prevented from being moved beyond the front upstanding edge portions 118 and 118' of the platform structure 104. Since, furthermore, the control circuit (not shown) electrically intervening between the solenoid-operated drive unit 116 and the second switch unit 126 positioned adjacent the gap 120 between the upstanding edge portions 118 and 118' of the platform structure 104 is arranged so that the solenoid-operated drive unit 116 remains disconnected from the power source therefor throughout playback operation, the drive unit 116 can not be actuated even when the second switch unit 126 is caused to close by the second recording disc accidentally or inadvertently inserted through the disc inlet and outlet slot 42 and brought into pressing contact with the detector element 122 during operation of the playback apparatus.

Upon completion of the playback operation with the recording disc D or when it is desired to interrupt the playback operation, the previously mentioned end-of-disc responsive switch means (not shown) is automatically actuated or the emergency stop switch unit 232 (FIG. 2) is manually operated. The pickup arm drive motor 216 is for a second time energized and, through the cam member, crank lever 220 and connecting link 222, drives the pick-up arm 210 to turn about the vertical axis of rotation of the fulcrum unit 212 from its end-of-disc angular position back to the rest position thereof. When the pickup arm 210 is thus returned into the rest position thereof, an electric signal is supplied to suitable switch means (not shown) electrically connected between the solenoid-operated drive unit 216 and the power source therefor and causes the switch means to close, thereby energizing the drive unit 216. The solenoid-operated drive unit 116 connected to the tiltable platform structure 104 is therefore actuated for a second time and causes the plunger 116a thereof to axially retract rearwardly with respect to the support structure 26, causing the tiltable platform structure 104 to angularly move downwardly against the force of the tension spring 112 from the raised angular position about the center axis of the cross shaft 110 with respect to the upper chassis portion 30 of the support structure 26.

As the tiltable platform structure 104 is thus moved downwardly from the raised angular position thereof with respect to the upper chassis portion 30 of the support structure 26, the projections 134 projecting from the front wall portion 106 of the platform structure 104 into the circular opening 106a in the wall portion 106 are brought into downwardly pressing engagement with the upper face of the flange portion 54b of the turntable structure 54. It therefore follows that the turntable structure 54 is forced to move downwardly together with the platform structure 54 with respect to the upper chassis portion 30 of the support structure 26 against the force of the compression spring 60. The spindle portion 54e of the turntable structure 54 (if the recording disc D is of the non-donut-shaped type) or the EP adapter 56 as well as the spindle portion 54e of the turntable structure 54 (if the recording disc D is of the donut-shaped type) is therefore downwardly disengaged from the disc clamping member 62, which is accordingly permitted to lower from its raised position to its initial position having the upper pivot portion 62d resting on the upper face of the stationary bracket member 66 by virtue of its own weight.

As the tiltable platform structure 104 is thus angularly moved downwardly with respect to the upper chassis portion 30 of the support structure 26, the rockable levers 84 and 84' having their respective front lug portions 90 and 90' engaged by the pins 132 and 132' on the lateral lug portions 130 and 130', respectively, of the platform structure 104 are allowed to turn about the aligned center axes of the pins 88 and 88', respectively, in the directions of the arrows a and a' (FIG. 7) by virtue of the weights of the front arm portions of the levers 84 and 84', the guide rollers 94a and 94b and the guide roller shaft 82. The rockable levers 84 and 84' are thus turned in the directions to have their respective front arm portions angularly moved toward the recording disc D on the table portion 54d of the turntable structure 54 until the guide rollers 94a and 94b on the guide roller shaft 82 carried by the front arm portions of the rockable levers 84 and 84' are received and rest on the upper face of the recording disc D as shown in each of FIGS. 8 and 15. The recording disc D is, thus, for a second time clamped between the set of guide rollers 94a and 94b and the set of drive rollers 80a, 80b and 80c which are held at rest with the drive motor 96 kept de-energized.

After the guide rollers 94a and 94b are received on the upper face of the recording disc D which is still carried on the upper face of the table portion 54d of the turntable structure 54, the pins 132 and 132' on the tiltable platform structure 104 are disengaged from the respective front lug portions 90 and 90' of the rockable levers 84 and 84', respectively, so that the platform structure 54 is angularly moved downwardly together with the turntable structure 54 with respect to the upper chassis portion 30 of the suppport structure 26 independently of the rockable levers 84 and 84'. Immediately after the recording disc D on the table portion 54d of the turntable structure 54 is clamped between the set of drive rollers 80a, 80b and 80c and the set of guide rollers 94a and 94b as above described, the table portion 54d of the turntable structure 54 is spaced apart downwardly from the lower face of the recording disc D and thereafter the spindle portion 54e of the turntable structure 54 (if the recording disc D is of the non-donut-shaped type) or the EP adapter 56 (if the recording disc D is of the donutOshaped type) is withdrawn downwardly from the center hold in the recording disc D. Thus, the recording disc D loses the support by the turntable structure 54 and is supported simply by and between the set of drive rollers 80a, 80b and 80c and the set of guide rollers 94a and 94b.

When the tiltable platform structure 104 angularly moved downwardly about the center axis of the cross shaft 110 reaches the lowermost angular position thereof with respect to the support structure 26 as shown in FIG. 3, the side wall portion 44' (FIG. 4) of the platform structure 104 is brought into downwardly pressing contact with the actuating plunger 128a of the third switch unit 128 underlying the wall portion 44'. The actuating plunger 128a of the switch unit 128 being thus caused to retract downwardly with respect to the support structure 26, the normally-open third switch unit 128 is caused to close and actuates the motor 96 for the disc transfer mechanism 76 to start operation. The motor 96 is now operated to cause its output shaft to rotate in a direction opposite to the direction of rotation for driving a recording disc to advance toward the turntable structure 54. The motor 96 being thus operated, the driving power delivered from the output shaft of the motor 96 is transmitted through the drive gear 98 and the driven gear 100 to the drive shaft 78 with the result that the recording disc D clamped between the set of drive rollers 80a, 80b and 80c and the guide rollers 94a and 94b is driven to move toward the disc guide structure 34 by the drive rollers 80a, 80b and 80c which are driven for rotation about the center axis of the drive shaft 78. The recording disc D thus driven to move away from the turntable structure 54 is transferred to the disc guide structure 34 and is guided between the respective inner panel portions 38a and 40a of the lower and upper guide members 38 and 40 of the guide structure 34 so as to travel toward the front wall portion 22 of the casing structure 20.

At the point of time when the recording disc D thus travelling away from the turntable structure 54 is disengaged from the drive rollers 80a, 80b and 80c and the guide rollers 94a and 94b, the rockable levers 84 and 84' tending to turn in the direction of the arrows a and a' (FIG. 7) about the aligned axes of rotation thereof are permitted to further turn in these directions until the rockable levers 84 and 84' reach the angular positions having the guide rollers 94a and 94b held in partially overlapping relationship to the drive rollers 80a, 80b and 80c on the drive shaft 78 when viewed from one side of the support structure 26, as shown in FIG. 9. When the rockable levers 84 and 84' are turned to such angular positions, the rockable lever 84' has its rear arm portion inclined slightly upwardly and accordingly has its rear lug portion 92' brought into upwardly pressing contact with the actuating plunger 102a of the first switch unit 102 positioned above the rear arm portion of the lever 84', as also shown in FIG. 9. The actuating plunger 102a of the first switch unit 102 being thus caused to retract upwardly with respect to the upper chassis portion 30 of the support structure 26, the first switch unit 102 of the normally-closed type if actuated to open. The first switch unit 102 and the rear lug portion 92' of the rockable lever 84' form part of departure detecting means operative to detect departure of a recording disc from the disc transfer mechanism 76 when the disc is being withdrawn outwardly from the casing structure 20.

As will be familiar with those skilled in the art, recording discs are presently available on a commercial basis in a minimum thickness of approximately ¼ inch. The above described departure detecting means of the system embodying the present invention is capable of detecting the withdrawal of the recording disc D with certainty even when the disc D has such a minimum thickness.

When the first switch unit 102 is made open as above described in response to the departure of the recording disc D from the disc transfer mechanism 76, each of the drive motor 96 for the disc transfer mechanism 76 and the solenoid-operated drive unit 116 connected to the tiltable platform structure 104 is disconnected from the power source therefor. The motor 96 being thus de-energized and brought to a stop, the drive rollers 80a, 80b and 80c cease rotation about the axis of rotation of the drive shaft 78. Furthermore, with the solenoid-operated drive unit 116 de-energized and made inoperative, the tiltable platform structure 104 is permitted to angularly move upwardly from the lower limit angular position to the raised angular position thereof about the center axis of the cross shaft 110 by the force of the tension spring 112. As a consequence, the turntable structure 54 is permitted to move upwardly through the U-shaped recess 30a in the upper chassis portion 30 of the support structure 26 by the force of the compression spring 60 so that the table portion 54a of the turntable structure 54 is brought into direct contact with the lower face of the lower clamping portion 62a of the clamping member 62 with the spindle portion 54e of the turntable structure 54 fully inserted into the blind axial bore in the clamping member 62 and the EP adapter 56 received in the annular concavity in the clamping portion 62c of the clamping member 62. The turntable structure 54 is moved upwardly with respect to the upper chassis portion 30 of the support structure 26 until the disc clamping member 62 is brought into engagement with the lower face of the cross member 46 through the rigid ball 64.

With the first switch unit 102 being made open, furthermore, suitable normally-open switch means (not shown) electrically connected between the solenoid operated drive unit 204 of the reset means and the power source for the drive unit 204 is actuated to close and electrically connects the drive unit 204 to the power source therefor. The solenoid-operated drive unit 204 is therefore energized and actuated to cause its plunger 204a to axially retract. This causes the bell-crank lever 194 of the reset means to turn about the center axis of the shaft 196 clockwise in FIG. 4, viz., in a direction opposite to the direction of the arrow e against the force of the tension spring 200, thereby urging the switch carrier plate 178 to move longitudinally forwardly with respect to the upper chassis portion 30 of the support structure 26 due to the pivotal engagement between the pin 198 on the carrier plate 178 and the first arm portion of the bell-crank lever 194 formed with the elongated slot 194a in the arm portion.

If, in this instance, the recording disc D which has been played back is of the standardized small-sized or 7-inch diameter type, the switch carrier plate 178 is held in the foremost limit position thereof with respect to the upper chassis portion 30 of the support structure 26 and accordingly to the front and rear pivotal shafts 148 and 150. When the switch carrier plate 178 is held in this position, the front and rear pivotal shafts 148 and 150 are held in such angular positions about their respective axes as to be locked to the slider plates 162 with each of the pins 152 and 152' on the front pivotal shaft 148 projecting upwardly through the laterally inner small-area portion of the front slot 164 in the slider plate 162 and with each of the pins 154 and 154' on the rear pivotal shaft 150 projecting upwardly through the laterally inner small-area portion of the rear slot 166 in the slider plate 162. The switch carrier plate 178 urged to move forwardly with respect to the front and rear pivotal shafts 148 and 150 by means of the bell-crank lever 194 of the reset means as above described is brought into forwardly pressing engagement at the first and second front edge portions 180 and 182 thereof with the upwardly directed respective front arm portions of the first and second carrier retaining members 188 and 190 and thus attempts to turn the retaining members 188 and 190 about the respective center axes of the shafts 148 and 150 in the directions to have their respective front arm portions inclined forwardly. Because, however, of the fact that the front and rear pivotal shafts 148 and 150 are held in such angular positions about their respective center axes as to be locked to the slider plate 162 as above described, the first and second carrier retaining members 188 and 190 are fixedly held in situ with respect to the upper chassis portion 30 of the support structure 26 and prohibit the carrier plate 178 from being forwardly moved from the foremost limit position thereof with respect to the front and rear pivotal shafts 148 and 150. The switch carrier plate 178 per se is in this fashion maintained also in situ with respect to the upper chassis portion 30 of the support structure 26.

If, on the other hand, the recording disc D which has been played back is of the standardized medium-sized or 10-inch diameter type, the switch carrier plate 178 is held in the intermediate longitudinal position thereof with respect to the upper chassis portion 30 of the support structure 26 and accordingly to the front and rear pivotal shafts 148 and 150. When the switch carrier plate 178 is held in the intermediate longitudinal position thereof, the front pivotal shaft 148 is held in such an angular position about the center axis thereof as to have the first carrier retaining member 188 held about the center axis of the shaft 148 in the angular position having its front arm portion inclined rearwardly and its rear arm portion inclined downwardly with each of the pins 152 and 152' on the shaft 148 inclined and located below the laterally outer large-area portion of the front slot 164 in the slider plate 162, while the rear pivotal shaft 150 is held in such an angular position about the center axis thereof as to be locked to the slider plates 162 with each of the pins 154 and 154' on the shaft 150 projecting upwardly through the laterally inner small-area portion of the rear slot 166 in the slider plate 162, as shown in FIG. 11. The switch carrier plate 178 urged to move forwardly with respect to the front and rear pivotal shafts 148 and 150 by means of the bell-crank lever 194 of the reset means as above described is therefore moved forwardly from its intermediate longitudinal position with respect to the pivotal shafts 148 and 150 and is brought into forwardly pressing engagement firstly at the first front edge portion 180 thereof with the front arm portion of the first carrier retaining member 188 and thereafter at the second front edge portion 182 thereof with the front arm portion of the second carrier retaining member 190. It therefore follows that the first arm portion of the first carrier retaining member 188 which has been held in the angular position having the front arm portion inclined rearwardly and its rear arm portion inclined downwardly about the center axis of the shaft 148 is forced to turn forwardly and upwardly about the center axis of the shaft 148 by the first front edge portion 180 of the switch carrier plate 178. On the other hand, the second carrier retaining member 190 is also urged to turn about the center axis of the rear pivotal shaft 150 by the upwardly pressing engagement of the second front edge portion 182 of the switch carrier plate 178 with the first arm portion of the retaining member 190. Since, however, the rear pivotal shaft 150 is held in such an angular position about the center axis thereof as to be locked to the slider plate 162 as above described, the second carrier retaining member 190 on the shaft 150 is fixedly held in situ with respect to the upper chassis portion 30 of the support structure 26. Thus, the switch carrier plate 178 is forwardly moved from the intermediate longitudinal portion to the foremost limit position thereof with respect to the upper chassis portion 30 of the support structure 26 and accordingly to the front and rear pivotal shafts 148 and 150 and has its first lug portion engaged at its rear edge by the hook portion 188a of the first carrier retaining member 188 turned into its initial angular position about the center axis of the front pivotal shaft 148 and its second lug portion 186 disengaged and spaced apart forwardly from the hook portion 190a of the second carrier retaining member 190 which has been held in situ about the center axis of the rear pivotal shaft 150.

If, furthermore, the recording disc D which has been played back is of the standardized large-sized or 12-inch diameter type, then the switch carrier plate 178 is held in the rearmost limit position thereof with respect to the upper chassis portion 30 of the support structure 26 and accordingly to the front and rear pivotal shafts 148 and 150. When the switch carrier plate 178 is held in the rearmost limit position thereof, each of the front and rear pivotal shafts 148 and 150 is held in such an angular position about the center axis of each of the shafts 148 and 150 as to have each of the first and second carrier retaining members 188 and 190 held about the center axis of each shaft in the angular position having its front arm portion inclined rearwardly and its rear arm portion inclined downwardly with each of the pins 152 and 152' on the shaft 148 inclined and located below the laterally outer large-area portion of the front slot 164 in the slider plate 162 and with each of the pins 154 and 154' on the shaft 150 inclined and located below the laterally outer large-area portion of the rear slot 166 in the slider plate 162. The switch carrier plate 178 urged to move forwardly with respect to the front and rear pivotal shafts 148 and 150 by means of the bell-crank lever 194 of the reset means as above described is therefore moved forwardly from its rearmost limit position with respect to the pivotal shafts 148 and 150 and is brought into forwardly pressing engagement at the first and second front edge portions 180 and 182 thereof with the respective front arm portions of the first and second carrier retaining members 188 and 190, respectively. It therefore follows that the first arm portion of each of the first and second carrier retaining members 188 and 190 which have been held in the angular positions having their respective first arm portions inclined rearwardly and their respective rear arm portions inclined downwardly about the respective center axes of the front and rear pivotal shafts 148 and 150, respectively, is forced to turn forwardly and upwardly about the center axis of each of the shafts 148 and 150 by each of the first and second front edge portions 180 and 182, respectively, of the switch carrier plate 178. Thus, the switch carrier plate 178 is forwardly moved from the rearmost limit position directly to the foremost limit position thereof with respect to the upper chassis portion 30 of the support structure 26 and accordingly to the front and rear pivotal shafts 148 and 150 and has its first lug portion engaged at its rear edge by the hook portion 188a of the first carrier retaining member 188 turned into its initial angular position about the center axis of the front pivotal shaft 148. When the switch carrier plate 178 is being moved forwardly from the rearmost limit position toward the foremost limit position thereof, the second lug portion 186 formed adjacent the front end of the carrier plate 178 passes over the hook portion 190a and the rear arm portion of the second carrier retaining member 190 which is maintained about the center axis of the rear pivotal shaft 150 in the angular position having its rear arm portion inclined downwardly until the switch carrier plate 178 is forwardly brought into pressing engagement at its front edge portions 180 and 182 with the respective front arm portions of the carrier retaining members 188 and 190, respectively.

When the switch carrier plate 178 is forwardly moved from the intermediate longitudinal position to the foremost limit position thereof with respect to the upper chassis portion 30 of the support structure 26, the first carrier retaining member 188 on the front pivotal shaft 148 is caused to turn about the center axis of the shaft 148 into its initial angular position having the front arm portion directed upwardly, as described above. This causes the front pivotal shaft 148 to turn about its center axis into the angular position having each of the pins 152 and 152' directed upwardly through the laterally outer large-area portion of the front slot 164 in the slider plate 162. Each of the pins 152 and 152' on the front pivotal shaft 148 is therefore brought out of engagement with a retaining edge portion intervening between the respective front ends of the small-area and large-area portions of the front slot 164 in the slider plate 162 and becomes ready to enter the laterally inner small-area portion of the slot 164. On the other hand, each of the pins 154 and 154' on the rear pivotal shaft 150 is located in and projects upwardly through the laterally inner small-area portion of the rear slot 166 in the slider plate 162 when the slider plate 162 is held in the previously mentioned intermediate lateral position with respect to the upper chassis portion 30 of the support structure 26 and accordingly to the front and rear pivotal shafts 148 and 150. When the switch carrier plate 178 is moved from the intermediate longitudinal position back to the foremost limit position with respect to the upper chassis portion 30 of the support structure 26, the slider plate 162 is permitted to move from the intermediate lateral position back to the laterally outermost limit position thereof with respect to the chassis portion 30 by the force of the tension spring 170, with not only each of the pins 154 and 154' on the rear pivotal shaft 150 received in the laterally inner small-area portion of the rear slot 166 in the slider plate 162 but each of the pins 152 and 152' on the front pivotal shaft 148 received in the laterally inner small-area portion of the front slot 164 in the slider plate 162.

When, on the other hand, the switch carrier plate 178 is forwardly moved from the rearmost limit position to the foremost limit position thereof with respect to the upper chassis portion 30 of the support structure 26, each of the first and second carrier retaining members 188 and 190 on the front and rear pivotal shafts 148 and 150, respectively, is caused to turn about the respective center axis of each of the shaft 148 and 150 into the initial angular position thereof having its front arm portion directed upwardly. This causes the front and rear pivotal shafts 148 and 150 to turn about their respective center axes into the angular positions having each of the pins 152 and 152' directed upwardly through the laterally outer large-area portion of the front slot 164 in the slider plate 162 and each of the pins 154 and 154' directed upwardly through the laterally outer large-area portion of the rear slot 166 in the slider plate 162. Each of the pins 152 and 152' on the front pivotal shaft 148 is thus brought out of engagement with the above mentioned retaining edge portion intervening between the respective front ends of the small-area and large-area portions of the front slot 164 in the slider plate 162 and becomes ready to enter the laterally inner small-area portion of the slot 164. Likewise, each of the pins 154 and 154' on the rear pivotal shaft 150 is brought out of engagement with a retaining edge portion intervening between the respective front ends of the small-area and large-arer portions of the rear slot 166 in the slider plate 162 and thus becomes ready to enter the laterally inner small-area portion of the slot 166. When the switch carrier plate 178 is moved from the rearmost limit position to the foremost limit position with respect to the upper chassis portion 30 of the support structure 26, the slider plate 162 is permitted to move from the previously mentioned laterally innermost limit position back to the laterally outermost limit position thereof with respect to the chassis portion 30 by the force of the tension spring 70, with each of the pins 152 and 152' on the front pivotal shaft 148 received in the laterally inner small-area portion of the front slot 164 in the slider plate 162 and each of the pins 154 and 154' on the rear pivotal shaft 150 received in the laterally inner small-area portion of the rear slot 166 in the slider plate 162.

When the recording disc D which has been played back is of the standardized small-sized or 7-inch diameter type, the slider plate 162 is maintained in the laterally outermost limit position thereof and the switch carrier plate 178 is maintained in the foremost limit position thereof with respect to the upper chassis portion 30 of the support structure 26 so that the actuation of the solenoid-operated drive unit 204 of the reset means brings about no mechanical actions and movements of the selective disc positioning mechanism and the switch carrier mechanism.

When the slider plate 162 is moved from the intermediate lateral position or the laterally innermost limit position to the laterally outermost limit position thereof with respect to the upper chassis portion 30 of the support structure 26 as hereinbefore described, the rear extension 162a of the slider plate 162 is brought into pressing engagement with the actuating plunger 208a of the normally-closed fifth switch unit 208 which is positioned in conjunction with the slider plate 162. This causes the switch unit 208 to open and disconnects the solenoid-operated drive unit 204 of the reset means from the power source therefor. The solenoid-operated drive unit 204 being thus de-energized, the bell-crank lever 194 is urged to turn about the center axis of the shaft 196 clockwise in FIG. 4, viz., in the direction of the arrow c and thereby urges the switch carrier plate 178 to move rearwardly from the foremost limit position thereof with respect to the upper chassis portion 30 of the support structure 26 by the force of the tension spring 200 anchored to the first arm portion of the bell-crank lever 194. The switch carrier plate 178 is, however, locked in the foremost limit position thereof with its first lug portion 184 engaged at its rear edge by the hook portion 188a of the first carrier retaining member 188 as shown in FIGS. 13 and 14 and is maintained in the foremost limit position thereof with respect to the upper chassis portion 30 of the support structure 26 against the force of the tension spring 200.

What is claimed is:

1. An automatic disc loading and unloading system of an audio and/or video recording-disc playback apparatus including a casing structure having a front wall portion formed with a laterally elongated opening and a support structure positioned within the casing structure, the system comprising elastic support elements having said support structure elastically supported by and within said casing structure through the elastic support elements, a disc support assembly positioned on the support structure and including a turntable structure rotatable about a vertical axis fixed with respect to the support structure, a disc transfer mechanism supported on the support structure and positioned partially intermediate between said disc support assembly and said front wall portion, the disc transfer mechanism being operative to drive a recording disc between the disc support assembly and said front wall portion, and a disc guide structure supported on said support structure and partially located between said front wall portion and said disc support assembly, said disc guide structure partially projecting outwardly from said front wall portion through said elongated opening substantially without being contacted at least in vertical direction by said front wall portion.

2. An automatic disc loading and unloading system for an audio and/or video recording disc playback apparatus including a casing structure, and a support structure positioned within or on the casing structure, the system comprising:

a disc support assembly positioned on said support structure, said disc support assembly including:

a turntable structure rotatable about a rotational axis fixed with respect to the support structure so as to support thereon said recording disc, said turntable structure being movable along said rotational axis;

a disc clamping member supported on said support structure and positioned above said turntable structure so that said disc clamping member is engageable with a central portion of said turntable structure; and, elevation means supported on said support structure for elevating said turntable structure along said rotational axis until said turntable structure engages with said clamping member thereby to clamp said recording disc therebetween;

a disc transfer mechanism supported on said support structure and operative to drive a recording disc to travel to and from a predetermined position with respect to said turntable structure, said transfer mechanism being operative to move away from the passage of said recording disc when said recording disc reaches said predetermined position;

a disc positioning mechanism operative to move the recording disc into a correct coaxial position having its center axis substantially aligned with the rotational axis of said turntable structure, the disc positioning mechanism comprising at least two disc advance stop elements located to have the recording disc engaged therewith at the outer circumferential edge thereof when the disc is moved past said disc transfer means into said correct coaxial position thereof for prohibiting the recording disc from further advancing beyond the stop elements away from said disc transfer mechanism when the recording disc is brought into engagement with both of the two stop elements;

said casing structure having a front wall portion formed with a laterally elongated opening and wherein the disc loading and unloading system further comprises elastic support elements having said support structure elastically supported by an within said casing structure through said elastic support elements; and, disc guide structure supported on said support structure and partially located between said front wall portion and said disc support assembly, said disc guide structure partially projecting outwardly from said front wall portion through said elongated opening substantially without being contacted at least in vertical direction by said front wall portion.

3. An automatic disc loading and unloading system as set forth in claim 2, in which said disc guide structure comprises at least two members consisting of lower and upper guide members each extending in part within said casing structure and projecting in part outwardly from said front wall portion through said elongated opening in the front wall, said lower and upper guide members being spaced apart vertically from each other outside said front wall portion and having a disc inlet and outlet slot therebetween externally of said front wall portion.

4. An automatic disc loading and unloading system for an audio and/or video recording disc playback apparatus including a casing structure, and a support structure positioned within or on the casing structure, the system comprising:

a disc support assembly positioned on said support structure, said disc support assembly including:

a turntable structure rotatable about a rotational axis fixed with respect to the support structure so as to support thereon said recording disc, said turntable structure being movable along said rotational axis;

a disc clamping member supported on said support structure and positioned above said turntable structure so that said disc clamping member is engageable with a central portion of said turntable structure; and, elevation means supported on said support structure for elevating said turntable structure along said rotational axis until said turntable structure engages with said clamping member thereby to clamp said recording disc therebetween;

a disc transfer mechanism supported on said support structure and operative to drive a recording disc to travel to and from a predetermined position with respect to said turntable structure, said transfer mechanism being operative to move away from the passage of said recording disc when said recording disc reaches said predetermined position;

a disc positioning mechanism operative to move the recording disc into a correct coaxial position having its center axis substantially aligned with the rotational axis of said turntable structure, the disc positioning mechanism comprising at least two disc advance stop elements located to have the recording disc engaged therewith at the outer circumferential edge thereof when the disc is moved past said disc transfer means into said correct coaxial position thereof for prohibiting the recording disc from further advancing beyond the stop elements away from said disc transfer mechanism when the recording disc is brought into engagement with both of the two stop elements;

disc-advance detecting means positioned intermediate between said disc transfer mechanism and said disc support assembly and responsive to the advancing movement of the recording disc being driven by the disc transfer mechanism to travel from the disc transfer mechanism toward said disc support assembly for producing a signal when the recording disc in said advancing movement reaches a predetermined position with respect to the detecting means;

said disk-advance detecting means being substantially centered in a vertical plane containing the axis of rotation of said turntable structure and substantially parallel with the direction of said advancing movement of the recording disc from said disc transfer mechanism toward said disc support assembly;

said disc transfer mechanism being operative to drive the recording disc to travel toward said disc support assembly on a substantially horizontal plane with respect to said support structure and in which said disc-advance detecting means is vertically movable across said horizontal plane; and, drive means responsive to said signal from said disc-advance detecting means and adapted so that the detecting means remains on said horizontal plane in the absence of said signal, said drive means being operative to drive the detecting means to vertically withdraw from the horizontal plane in response to said signal.

5. An automatic disc loading and unloading system as set forth in claim 4, in which said disc transfer mechanism comprises at least two disc seizing members operative to hold the recording disc therebetween and to drive the recording disc to travel on said horizontal plane toward said disc support assembly.

6. An automatic disc loading and unloading system as set forth in claim 5, in which at least one of said disc seizing members is vertically movable toward and away from said horizontal plane, said disc loading and unloading system further comprising disc position detecting means responsive to the advancing movement of the recording disc toward said correct coaxial position of the recording disc with respect to said disc support assembly and operative to produce a signal when the recording disc moved toward the correct coaxial position reaches the coaxial position, said drive means being operative to permit said one of the seizing members to have the recording disc seized between the seizing members in response to the signal from said disc-position detecting means and being adapted to permit said one of the disc seizing members to vertically move away from said horizontal plane in the absence of the signal from said disc position detecting means.

7. An automatic disc loading and unloading system for an audio/and/or video recording disc playback apparatus including a casing structure, and a support structure positioned within or on the casing structure, the system comprising:

a disc support assembly positioned on said support structure, said disc support assembly including:
a turntable structure rotatable about a rotational axis fixed with respect to the support structure so as to support thereon said recording disc, said turntable structure being movable along said rotational axis;

a disc clamping member supported on said support structure and positioned above said turntable structure so that said disc clamping member is engageable with a central portion of said turntable structure; and, elevation means supported on said support structure for elevating said turntable structure along said rotational axis until said turntable structure engages with said clamping member thereby to clamp said recording disc therebetween;

a disc transfer mechanism supported on said support structure and operative to drive a recording disc to travel to and from a predetermined position with respect to said turntable structure, said transfer mechanism being operative to move away from the passage of said recording disc when said recording disc reaches said predetermined position and operative to drive the recording disc to travel toward said disc support assembly on a substantially horizontal plane with respect to said support structure;

a disc positioning mechanism operative to move the recording disc into a correct coaxial position having its center axis substantially aligned with the rotational axis of said turntable structure, the disc positioning mechanism comprising at least two disc advance stop elements located to have the recording disc engaged therewith at the outer circumferential edge thereof when the disc is moved past said disc transfer means into said correct coaxial position thereof for prohibiting the recording disc from further advancing beyond the stop elements away from said disc transfer mechanism when the recording disc is brought into engagement with both of the two stop elements;

detecting means positioned intermediate between said disc transfer mechanism and said disc support assembly and responsive to the advancing movement of the recording disc being driven by the disc transfer mechanism to travel from the disc transfer mechanism toward said disc support assembly for producing a signal when the recording disc in said advancing movement reaches a predetermined position with respect to the detecting means; said detecting means being substantially centered on a vertical plane containing the axis of rotation of said turntable structure and substantially parallel with the direction of said advancing movement of the recording disc from said disc transfer mechanism toward said disc support assembly and vertically movable across the horizontal plane of said recording disc;

drive means responsive to the signal from said detecting means and adapted to permit the detecting means to remain on said horizontal plane in the absence of said signal, said drive means being operative to drive the detecting means to vertically withdraw from the horizontal plane in response to said signal; and, disc-position detecting means including means for producing a signal in response to a predetermined position of said disc; and, disc-advance blocking means positioned intermediate between said disc transfer mechanism and said disc support assembly and operative to vertically move between a position on said horizontal plane and a position away from the horizontal plane, said drive means being adapted to permit the disc-advance blocking means to stay in said position on said horizontal plane in the absence of the signal from said detecting means and in the presence of the signal from said disc-position detecting means and being operative to drive the disc-advance blocking means to move into said position withdrawn from said horizontal plane in response to the signal from said detecting means.

8. An automatic disc loading and unloading system as set forth in claim 7, further comprising turntable lowering means supported on said support structure and downwardly engageable with said turntable structure, the turntable lowering means being vertically movable with respect to said support structure and being brought into downwardly pressing engagement with said turntable structure and forcing the turntable structure to move downwardly below said correct coaxial position when the turntable lowering means is moved downwardly to a predetermined vertical position with respect to the support structure.

9. An automatic disc loading and unloading system as set forth in claim 8, in which said drive means is operative to bring said turntable lowering means into said downwardly pressing engagement with said turntable structure in response to the signal from said disc-advance detecting means.

10. An automatic disc loading and unloading system as set forth in any of claims 5 to 9, further comprising:
- playback means operative when said automatic disc loading and unloading system is in a playback condition; and,
- means responsive to said playback condition of the playback means and operative to hold said drive means inoperative throughout said playback condition.

11. An automatic disc loading and unloading system for an audio/and/or video recording disc playback apparatus including a casing structure, and a support structure positioned within or on the casing structure, the system comprising:
- a disc support assembly positioned on said support structure, said disc support adssembly including:
- a turntable structure rotatable about a rotational axis fixed with respect to the support structure so as to support thereon said recording disc, said turntable structure being movable along said rotational axis;
- a disc clamping member supported on said support structure and positioned above said turntable structure so that said disc clamping member is engageable with a central portion of said turntable structure; and,
- elevation means supported on said support structure for elevating said turntable structure along said rotational axis until said turntable structure engages with said clamping member thereby to clamp said recording disc therebetween;
- a disc transfer mechanism supported on said support structure and operative to drive a recording disc to travel to and from a predetermined position with respect to said turntable structure, said transfer mechanism being operative to move away from the passage of said recording disc when said recording disc reaches said predetermined position and operative to drive the recording disc to travel toward said disc support assembly on a substantially horizontal plane with respect to said support structure;
- a disc positioning mechanism operative to move the recording disc into a correct coaxial position having its center axis substantially aligned with the rotational axis of said turntable structure, the disc positioning mechanism comprising at least two disc advance stop elements located to have the recording disc engaged therewith at the outer circumferential edge thereof when the disc is moved past said disc transfer means into said correct coaxial position thereof for prohibiting the recording disc from further advancing beyond the stop elements away from said disc transfer mechanism when the recording disc is brought into engagement with both of the two stop elements;
- detecting means positioned intermediate between said disc transfer mechanism and said disc support assembly and responsive to the advancing movement of the recording disc being driven by the disc transfer mechanism to travel from the disc transfer mechanism toward said disc support assembly for producing a signal when the recording disc in said advancing movement reaches a predetermined position with respect to the detecting means; said detecting means being substantially centered on a vertical plane containing the axis of rotation of said turntable structure and substantially parallel with the direction of said advancing movement of the recording disc from said disc transfer mechanism toward said disc support assembly and vertically movable across the horizontal plane of said recording disc;
- drive means responsive to the signal from said detecting means and adapted to permit the detecting means to remain on said horizontal plane in the absence of said signal, said drive means being operative to drive the detecting means to vertically withdraw from the horizontal plane in response to said signal; and,
- disc-position detecting means responsive to the engagement of the recording disc with both of said disc-advance stop elements for producing a signal when the recording disc is brought into engagement at the outer circumferential edge thereof with both of said stop elements;
- a carrier member which has said disc-position detecting means carried thereon and which is movable with respect to said support structure in a direction substantially parallel with the direction of advancement of the recording disc from said disc transfer mechanism toward said disc support assembly, said carrier member being movable in said longitudinal direction away from said disc transfer mechanism; and,
- said disc-advance stop elements being located to have the recording disc of a first diameter engaged therewith at the outer circumferential edge thereof when the recording disc of the first diameter is brought into the correct coaxial position thereof with respect to said turntable structure, said stop elements being rotatable together about a common axis which is substantially normal to a vertical plane containing the axis of rotation of said turntable structure and substantially parallel with said longitudinal direction of movement of said carrier member, each of the stop elements being rotatable about said common axis of rotation of the stop members between an operative position at least partially located on said horizontal plane and operative to have the recording disc of said first diameter engaged therewith at the outer circumferential edge of the disc and an inoperative position withdrawn from said horizontal plane for permitting a recording disc of a second diameter larger than said first diameter to clear the stop elements when the recording disc of the second diameter is driven to travel in said horizontal plane by and away from said disc transfer mechanism.

12. An automatic disc loading and unloading system for an audio and/or video recording disc playback apparatus including a casing structure, and a support structure positioned within or on the casing structure, the system comprising:

a disc support assembly positioned on said support structure, said disc support assembly including:

a turntable structure rotatable about a rotational axis fixed with respect to the support structure so as to support thereon said recording disc, said turntable structure being movable along said rotational axis;

a disc clamping member supported on said support structure and positioned above said turntable structure so that said disc clamping member is engageable with a central portion of said turntable structure; and, elevation means supported on said support structure for elevating said turntable structure along said rotational axis until said turntable structure engages with said clamping member thereby to clamp said recording disc therebetween;

a disc transfer mechanism supported on said support structure and operative to drive a recording disc to travel to and from a predetermined position with respect to said turntable structure, said transfer mechanism being operative to move away from the passage of said recording disc when said recording disc reaches said predetermined position;

a disc positioning mechanism operative to move the recording disc into a correct coaxial position having its center axis substantially aligned with the rotational axis of said turntable structure, the disc positioning mechanism comprising at least two disc advance stop elements located to have the recording disc engaged therewith at the outer circumferential edge thereof when the disc is moved past said disc transfer means into said correct coaxial position thereof for prohibiting the recording disc from further advancing beyond the stop elements away from said disc transfer mechanism when the recording disc is brought into engagement with both of the two stop elements;

said disc transfer mechanism being operative to drive a recording disc toward said disc support assembly on a substantially horizontal plane with respect to said support structure;

disc-position detecting means responsive to the engagement of the recording disc with both of said disc-advance stop elements for producing a signal when the recording disc is brought into engagement at the outer circumferential edge thereof with both of said stop elements;

said disc positioning mechanism including a carrier member which has said disc-position detecting means carried thereon and which is movable with respect to said support structure in a direction substantially parallel with the direction of advancement of the recording disc from said disc transfer mechanism toward said disc support assembly, said carrier member being movable in a longitudinal direction away from said disc transfer mechanism; and, said disc-advance stop elements being located to have the recording disc of a first diameter engaged therewith at the outer circumferential edge thereof when a recording disc of the first diameter is brought into correct coaxial position thereof with respect to said turntable structure, said stop elements being rotatable together about a common axis which is substantially normal to a vertical plane containing the axis of rotation of said turntable structure and substantially parallel with said longitudinal direction of movement of said carrier member, each of said stop elements being rotatable about said common axis of rotation of the stop members between an operative position at least partially located on said horizontal plane and operative to have the recording disc of said first diameter engaged therewith at the outer circumferential edge of the disc and an inoperative position withdrawn from said horizontal plane for permitting a recording disc of a second diameter larger than said first diameter to clear the stop elements when the recording disc of the second diameter is driven on said horizontal plane by and away from said disc transfer mechanism.

13. An automatic disc loading and unloading system as set forth in claim 12, in which said disc-advance stop elements constitute first disc-advance stop elements of said disc positioning mechanism which further comprises a pair of second disc-advance stop elements which are located to have a recording disc of said second diameter engaged therewith at the outer circumferential edge of the disc when the recording disc of the second diameter is brought into the correct coaxial position thereof with respect to said turntable structure.

14. An automatic disc loading and unloading system as set forth in claim 13, in which said carrier member is movable in said longitudinal direction thereof between a first position having a recording disc of said first diameter engaged therewith at the outer circumferential edge of the disc and a second position having a recording disc of said second diameter engaged therewith at the outer circumferential edge of the disc.

15. An automatic disc loading and unloading system as set forth in claim 14, in which said second disc-advance stop elements being rotatable together about a common axis of rotation substantially parallel with the common axis of rotation of said disc-advance stop elements, each of the second disc-advance stop elements being rotatable about the common axis of the second disc-advance stop elements between an operative position at least partially located on said horizontal plane and operative to have the recording disc of the second diameter engaged therewith at the outer circumferential edge of the disc and an inoperative position withdrawn from said horizontal plane for permitting the recording disc of the second diameter to clear the second disc-advance stop elements when the recording disc of the second diameter is driven to travel on said horizontal plane by and away from said disc transfer mechanism.

16. An automatic disc loading and unloading system as set forth in claim 14, in which said second disc-advance stop elements are fixed with respect to said support structure.

17. An automatic disc loading and unloading system as set forth in claim 14, 15 or 16, in which said disc positioning mechanism further comprises a carrier retaining member rotatable with said first disc-advance stop elements engageable with said carrier member, said retaining member being rotatable about the common axis of rotation of said first disc-advance stop elements between a first position held in locking engagement with the carrier member for holding the carrier member in said first position thereof when each of the first disc-advance stop elements is held in said operative position thereof and a second position disengaged from said carrier member for allowing the carrier member to move from said first position thereof to said second position thereof when each of the first disc-advance stop elements is in held in said inoperative position thereof.

18. An automatic disc loading and unloading system as set forth in claim 14, 15 or 16, further comprising reset means operative to drive said carrier member from said second position to said first position thereof.

19. An automatic disc loading and unloading system for an audio and/or video recording disc playback apparatus including a casing structure, and a support structure positioned within or on the casing structure, the system comprising:
- a disc support assembly positioned on said support structure, said disc support assembly including:
- a turntable structure rotatable about a rotational axis fixed with respect to the support structure so as to support thereon said recording disc, said turntable structure being movable along said rotational axis;
- a disc clamping member supported on said support structure and positioned above said turntable structure so that said disc clamping member is engageable with a central portion of said turntable structure; and,
- elevation means supported on said support structure for elevating said turntable structure along said rotational axis until said turntable structure engages with said clamping member thereby to clamp said recording disc therebetween;
- a disc transfer mechanism supported on said support structure and operative to drive a recording disc to travel to and from a predetermined position with respect to said turntable structure, said transfer mechanism being operative to move away from the passage of said recording disc when said recording disc reaches said predetermined position;
- a disc positioning mechanism operative to move the recording disc into a correct coaxial position having its center axis substantially aligned with the rotational axis of said turntable structure, the disc positioning mechanism comprising at least two disc advance stop elements located to have the recording disc engaged therewith at the outer circumferential edge thereof when the disc is moved past said disc transfer means into said correct coaxial position thereof for prohibiting the recording disc from further advancing beyond the stop elements away from said disc transfer mechanism when the recording disc is brought into engagement with both of the two stop elements;
- said turntable structure being formed with an upwardly open concavity having a circular cross section with a diameter not less than the diameter of the circular cross section of said adapter so that the adapter can be withdrawn downwardly into the concavity in the turntable structure; and,
- biasing means supported by said support structure and urging said turntable structure upwardly towards said disc clamping member until the turntable structure is brought into engagement with the clamping member, wherein the disc loading and unloading system further comprises turntable lowering means supported on said support structure and downwardly engageable with said turntable structure, the turntable lowering means being vertically movable with respect to the support structure and being brought into downwardly pressing engagement with the turntable structure and forcing the turntable structure below said clamping member when the turntable lowering means is moved downwardly to a predetermined vertical position with respect to the support structure.

20. The apparatus of claim 19 wherein said disc clamping member is formed with a downwardly open concavity having a circular cross section with a diameter not less than the diameter of the circular cross section of said adapter so that the adapter can project upwardly into the concavity in the clamping member.

21. An automatic disc loading and unloading system for an audio/and/or video recording disc playback apparatus including a casing structure, and a support structure positioned within or on the casing structure, the system comprising:
- a disc support assembly positioned on said support structure, said disc support assembly including:
- a turntable structure rotatable about a rotational axis fixed with respect to the support structure so as to support thereon said recording disc, said turntable structure being movable along said rotational axis;
- a disc clamping member supported on said support structure and positioned above said turntable structure so that said disc clamping member is engageable with a central portion of said turntable structure; and,
- elevation means supported on said support structure for elevating said turntable structure along said rotational axis until said turntable structure engages with said clamping member thereby to clamp said recording disc therebetween;
- a disc transfer mechanism supported on said support structure and operative to drive a recording disc to travel to and from a predetermined position with respect to said turntable structure, said transfer mechanism being operative to move away from the passage of said recording disc when said recording disc reaches said predetermined position and operative to drive the recording disc to travel toward said disc support assembly on a substantially horizontal plane with respect to said support structure;
- a disc positioning mechanism operative to move the recording disc into a correct coaxial position having its center axis substantially aligned with the rotational axis of said turntable structure, the disc positioning mechanism comprising at least two disc advance stop elements located to have the recording disc engaged therewith at the outer circumferential edge thereof when the disc is moved past said disc transfer means into said correct coaxial position thereof for prohibiting the recording disc from further advancing beyond the stop elements away from said disc transfer mechanism when the recording disc is brought into engagement with both of the two stop elements;

detecting means positioned intermediate between said disc transfer mechanism and said disc support assembly and responsive to the advancing movement of the recording disc being driven by the disc transfer mechanism to travel from the disc transfer mechanism toward said disc support assembly for producing a signal when the recording disc in said advancing movement reaches a predetermined position with respect to the detecting means; said detecting means being substantially centered on a vertical plane containing the axis of rotation of said turntable structure and substantially parallel with the direction of said advancing movement of the recording disc from said disc transfer mechanism toward said disc support assembly and vertically movable across the horizontal plane of said recording disc;

drive means responsive to the signal from said detecting means and adapted to permit the detecting means to remain on said horizontal plane in the absence of said signal, said drive means being operative to drive the detecting means to vertically withdraw from the horizontal plane in response to said signal;

playback means operative when said automatic disc loading and unloading system is in a playback condition; and, means responsive to said playback condition of the playback means and operative to hold said drive means inoperative throughout said playback condition.

* * * * *